United States Patent
Nakamura

(10) Patent No.: US 10,567,612 B2
(45) Date of Patent: Feb. 18, 2020

(54) IMAGE PROCESSING APPARATUS, CONTROL METHOD THEREOF, AND STORAGE MEDIUM STORING PROGRAM

(71) Applicant: CANON KABUSHIKI KAISHA, Tokyo (JP)

(72) Inventor: Tatsuya Nakamura, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 26 days.

(21) Appl. No.: 15/976,639

(22) Filed: May 10, 2018

(65) Prior Publication Data

US 2018/0332196 A1    Nov. 15, 2018

(30) Foreign Application Priority Data

May 12, 2017  (JP) ................... 2017-095329

(51) Int. Cl.
| | |
|---|---|
| *H04N 5/77* | (2006.01) |
| *H04N 1/21* | (2006.01) |
| *H04N 5/225* | (2006.01) |
| *G03B 17/18* | (2006.01) |
| *H04N 5/907* | (2006.01) |
| *H04N 5/91* | (2006.01) |
| *H04B 7/26* | (2006.01) |

(52) U.S. Cl.
CPC .......... *H04N 1/2129* (2013.01); *G03B 17/18* (2013.01); *H04B 7/26* (2013.01); *H04N 5/225* (2013.01); *H04N 5/77* (2013.01); *H04N 5/772* (2013.01); *H04N 5/907* (2013.01); *H04N 5/91* (2013.01)

(58) Field of Classification Search
None
See application file for complete search history.

(56) References Cited

U.S. PATENT DOCUMENTS

| | | | | |
|---|---|---|---|---|
| 2002/0052864 | A1* | 5/2002 | Yamamoto | ........... G11B 27/105 |
| 2007/0044132 | A1* | 2/2007 | Kubo | ................... H04N 7/1675 |
| | | | | 725/116 |

FOREIGN PATENT DOCUMENTS

| | | |
|---|---|---|
| JP | 2003-264729 A | 9/2003 |
| JP | 2007-81739 A | 3/2007 |

* cited by examiner

*Primary Examiner* — Mark T Monk
(74) *Attorney, Agent, or Firm* — Canon U.S.A., Inc. IP Division

(57) ABSTRACT

An image processing apparatus that transfers recorded image data includes a control unit configured to perform control in such a manner that in a case where transfer of image data is instructed during recording of the image data, previously recorded image data is set as a transfer target when a predetermined period of time has not elapsed after recording of the previously recorded image data is stopped, and image data currently being recorded is set as the transfer target when the predetermined period of time has elapsed.

15 Claims, 34 Drawing Sheets

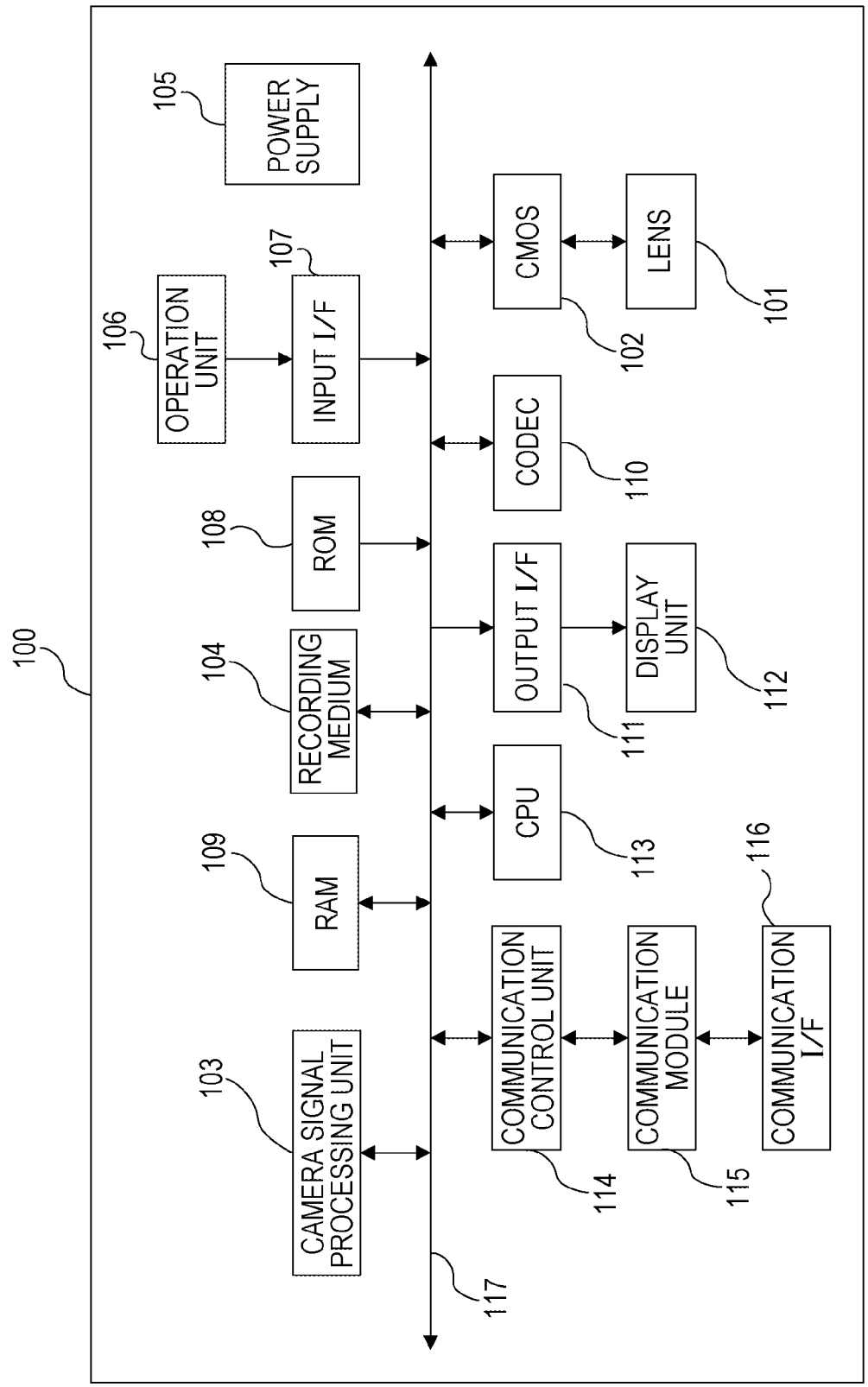

FIG. 5B

| 5100 | 5101 | 5102 | 5103 |
|---|---|---|---|
| SCENE NUMBER [0]: Scene #1 | FILE NUMBER [0][0]: File #1 | FILE NUMBER [0][1]: FileClose | FILE NUMBER [0][2]: UNREGISTERED |
| SCENE NUMBER [1]: UNREGISTERED | FILE NUMBER [1][0]: UNREGISTERED | FILE NUMBER [1][1]: UNREGISTERED | FILE NUMBER [1][2]: UNREGISTERED |
| SCENE NUMBER [2]: UNREGISTERED | FILE NUMBER [2][0]: UNREGISTERED | FILE NUMBER [2][1]: UNREGISTERED | FILE NUMBER [2][2]: UNREGISTERED |
| SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

FIG. 5C

| 5200 | 5201 | 5211 5202 | 5212 |
|---|---|---|---|
| SCENE NUMBER [0]: Scene #1 | FILE NUMBER [0][0]: File #1 | FILE NUMBER [0][1]: FileClose | FILE NUMBER [0][2]: UNREGISTERED |
| SCENE NUMBER [1]: Scene #2 | FILE NUMBER [1][0]: File #2 | FILE NUMBER [1][1]: FileClose | FILE NUMBER [1][2]: UNREGISTERED |
| SCENE NUMBER [2]: UNREGISTERED | FILE NUMBER [2][0]: UNREGISTERED | FILE NUMBER [2][1]: UNREGISTERED | FILE NUMBER [2][2]: UNREGISTERED |
| SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| 5300 | | 5321 | 5322 |
|---|---|---|---|
| SCENE NUMBER [0]: Scene #1 | FILE NUMBER [0][0]: File #1 | FILE NUMBER [0][1]: FileClose | FILE NUMBER [0][2]: UNREGISTERED |
| SCENE NUMBER [1]: Scene #2 | FILE NUMBER [1][0]: File #2 | FILE NUMBER [1][1]: FileClose | FILE NUMBER [1][2]: UNREGISTERED |
| SCENE NUMBER [2]: Scene #3 | FILE NUMBER [2][0]: File #3 | FILE NUMBER [2][1]: UNREGISTERED | FILE NUMBER [2][2]: UNREGISTERED |
| SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| SCENE NUMBER [0]: Scene #1 | FILE NUMBER [0][0]: File #1 | FILE NUMBER [0][1]: FileClose | FILE NUMBER [0][2]: UNREGISTERED |
|---|---|---|---|
| SCENE NUMBER [1]: Scene #2 | FILE NUMBER [1][0]: File #2 | FILE NUMBER [1][1]: FileClose | FILE NUMBER [1][2]: UNREGISTERED |
| SCENE NUMBER [2]: Scene #3 | FILE NUMBER [2][0]: File #3 | FILE NUMBER [2][1]: File #4 | FILE NUMBER [2][2]: UNREGISTERED |
| SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| | | | |
|---|---|---|---|
| SCENE NUMBER [0]: Scene #1 | FILE NUMBER [0][0]: File #1 | FILE NUMBER [0][1]: FileClose | FILE NUMBER [0][2]: UNREGISTERED |
| SCENE NUMBER [1]: Scene #2 | FILE NUMBER [1][0]: File #2 | FILE NUMBER [1][1]: FileClose | FILE NUMBER [1][2]: UNREGISTERED |
| SCENE NUMBER [2]: Scene #3 | FILE NUMBER [2][0]: File #3 | FILE NUMBER [2][1]: File #4 | FILE NUMBER [2][2]: UNREGISTERED |
| SCENE NUMBER [3]: Scene #4 | FILE NUMBER [3][0]: File #5 | FILE NUMBER [3][1]: UNREGISTERED | FILE NUMBER [3][2]: UNREGISTERED |
| SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| | | | |
|---|---|---|---|
| SCENE NUMBER [0]: Scene #1 | FILE NUMBER [0][0]: File #1 | FILE NUMBER [0][1]: FileClose | FILE NUMBER [0][2]: UNREGISTERED |
| SCENE NUMBER [1]: Scene #2 | FILE NUMBER [1][0]: File #2 | FILE NUMBER [1][1]: FileClose | FILE NUMBER [1][2]: UNREGISTERED |
| SCENE NUMBER [2]: Scene #3 | FILE NUMBER [2][0]: File #3 | FILE NUMBER [2][1]: File #4 | FILE NUMBER [2][2]: FileClose |
| SCENE NUMBER [3]: Scene #4 | FILE NUMBER [3][0]: File #5 | FILE NUMBER [3][1]: File #6 | FILE NUMBER [3][2]: UNREGISTERED |
| SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| | | | |
|---|---|---|---|
| 5700 | SCENE NUMBER [0]: Scene #1 | FILE NUMBER [0][0]: File #1 | FILE NUMBER [0][1]: FileClose | FILE NUMBER [0][2]: UNREGISTERED |
| 5710 | SCENE NUMBER [1]: Scene #2 | FILE NUMBER [1][0]: File #2 | FILE NUMBER [1][1]: FileClose | FILE NUMBER [1][2]: UNREGISTERED |
| 5720 | SCENE NUMBER [2]: Scene #3 | FILE NUMBER [2][0]: File #3 | FILE NUMBER [2][1]: File #4 | FILE NUMBER [2][2]: FileClose |
| 5730 | SCENE NUMBER [3]: Scene #4 | FILE NUMBER [3][0]: File #5 | FILE NUMBER [3][1]: File #6 | FILE NUMBER [3][2]: FileClose |
| 5740 | SCENE NUMBER [4]: Scene #5 | FILE NUMBER [4][0]: File #7 | FILE NUMBER [4][1]: File #8 | FILE NUMBER [4][2]: FileClose |
| | | 5741 | 5742 | 5743 |

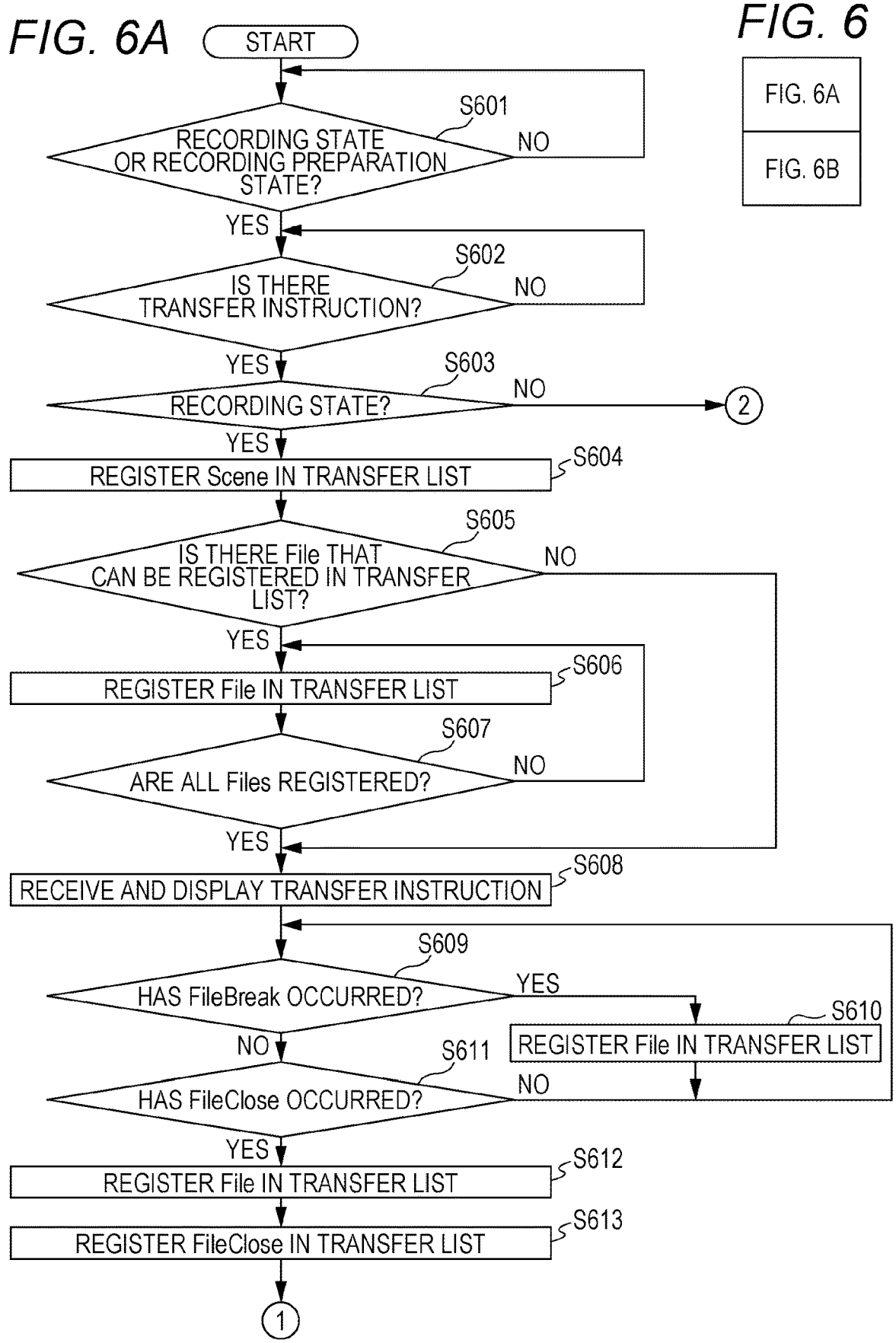

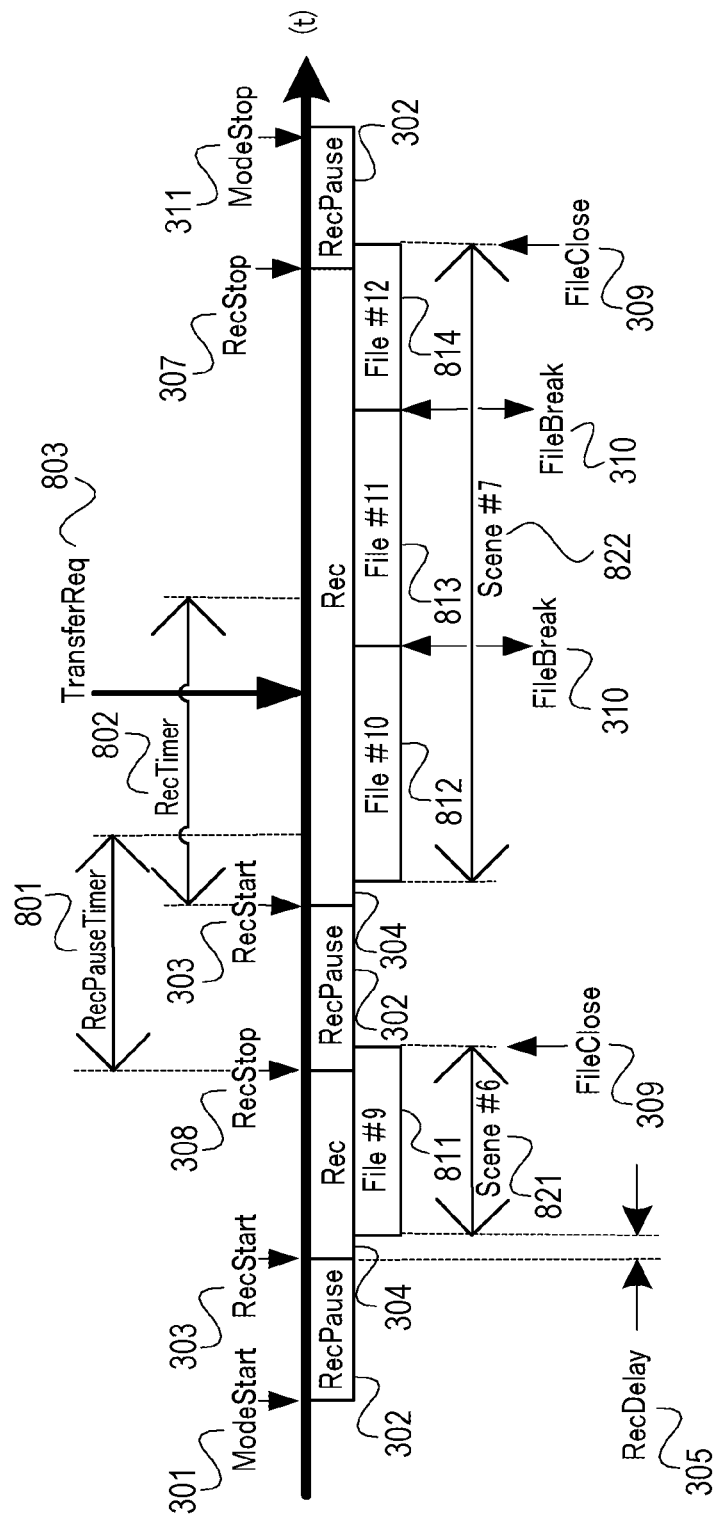

FIG. 9A

| | 9011 | 9021 | 9012 |
|---|---|---|---|
| SCENE NUMBER [0]: Scene #6 | FILE NUMBER [0][0]: File #9 | FILE NUMBER [0][1]: FileClose | FILE NUMBER [0][2]: UNREGISTERED |
| SCENE NUMBER [1]: Scene #7 | FILE NUMBER [1][0]: UNREGISTERED | FILE NUMBER [1][1]: UNREGISTERED | FILE NUMBER [1][2]: UNREGISTERED |
| SCENE NUMBER [2]: UNREGISTERED | FILE NUMBER [2][0]: UNREGISTERED | FILE NUMBER [2][1]: UNREGISTERED | FILE NUMBER [2][2]: UNREGISTERED |
| SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| | 9100 | 9101 | 9102 |
|---|---|---|---|
| 9110 | SCENE NUMBER [0]: Scene #7 | FILE NUMBER [0][0]: File #10 | FILE NUMBER [0][1]: UNREGISTERED | FILE NUMBER [0][2]: UNREGISTERED |
| | SCENE NUMBER [1]: UNREGISTERED | FILE NUMBER [1][0]: UNREGISTERED | FILE NUMBER [1][1]: UNREGISTERED | FILE NUMBER [1][2]: UNREGISTERED |
| | SCENE NUMBER [2]: UNREGISTERED | FILE NUMBER [2][0]: UNREGISTERED | FILE NUMBER [2][1]: UNREGISTERED | FILE NUMBER [2][2]: UNREGISTERED |
| | SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| | SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

FIG. 9C

| 9200 | 9201 | 9202 |
|---|---|---|
| SCENE NUMBER [0]: Scene #6 | FILE NUMBER [0][0]: File #9 | FILE NUMBER [0][1]: FileClose | FILE NUMBER [0][2]: UNREGISTERED |
| SCENE NUMBER [1]: UNREGISTERED | FILE NUMBER [1][0]: UNREGISTERED | FILE NUMBER [1][1]: UNREGISTERED | FILE NUMBER [1][2]: UNREGISTERED |
| SCENE NUMBER [2]: UNREGISTERED | FILE NUMBER [2][0]: UNREGISTERED | FILE NUMBER [2][1]: UNREGISTERED | FILE NUMBER [2][2]: UNREGISTERED |
| SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| | 9301 | 9302 | 9312 |
|---|---|---|---|
| 9300 | | 9311 | |
| SCENE NUMBER [0]: Scene #6 | FILE NUMBER [0][0]: File #9 | FILE NUMBER [0][1]: FileClose | FILE NUMBER [0][2]: UNREGISTERED |
| SCENE NUMBER [1]: Scene #7 | FILE NUMBER [1][0]: File #10 | FILE NUMBER [1][1]: UNREGISTERED | FILE NUMBER [1][2]: UNREGISTERED |
| SCENE NUMBER [2]: UNREGISTERED | FILE NUMBER [2][0]: UNREGISTERED | FILE NUMBER [2][1]: UNREGISTERED | FILE NUMBER [2][2]: UNREGISTERED |
| SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

| | 9401 | 9411 9421 | 9402 | 9412 |
|---|---|---|---|---|
| 9400 | | | | |
| SCENE NUMBER [0]: Scene #8 | FILE NUMBER [0][0]: File #13 | FILE NUMBER [0][1]: FileClose | FILE NUMBER [0][2]: UNREGISTERED |
| SCENE NUMBER [1]: Scene #9 | FILE NUMBER [1][0]: File #14 | FILE NUMBER [1][1]: FileClose | FILE NUMBER [1][2]: UNREGISTERED |
| SCENE NUMBER [2]: Scene #10 | FILE NUMBER [2][0]: UNREGISTERED | FILE NUMBER [2][1]: UNREGISTERED | FILE NUMBER [2][2]: UNREGISTERED |
| 9410 — SCENE NUMBER [3]: UNREGISTERED | FILE NUMBER [3][0]: UNREGISTERED | FILE NUMBER [3][1]: UNREGISTERED | FILE NUMBER [3][2]: UNREGISTERED |
| 9420 — SCENE NUMBER [4]: UNREGISTERED | FILE NUMBER [4][0]: UNREGISTERED | FILE NUMBER [4][1]: UNREGISTERED | FILE NUMBER [4][2]: UNREGISTERED |

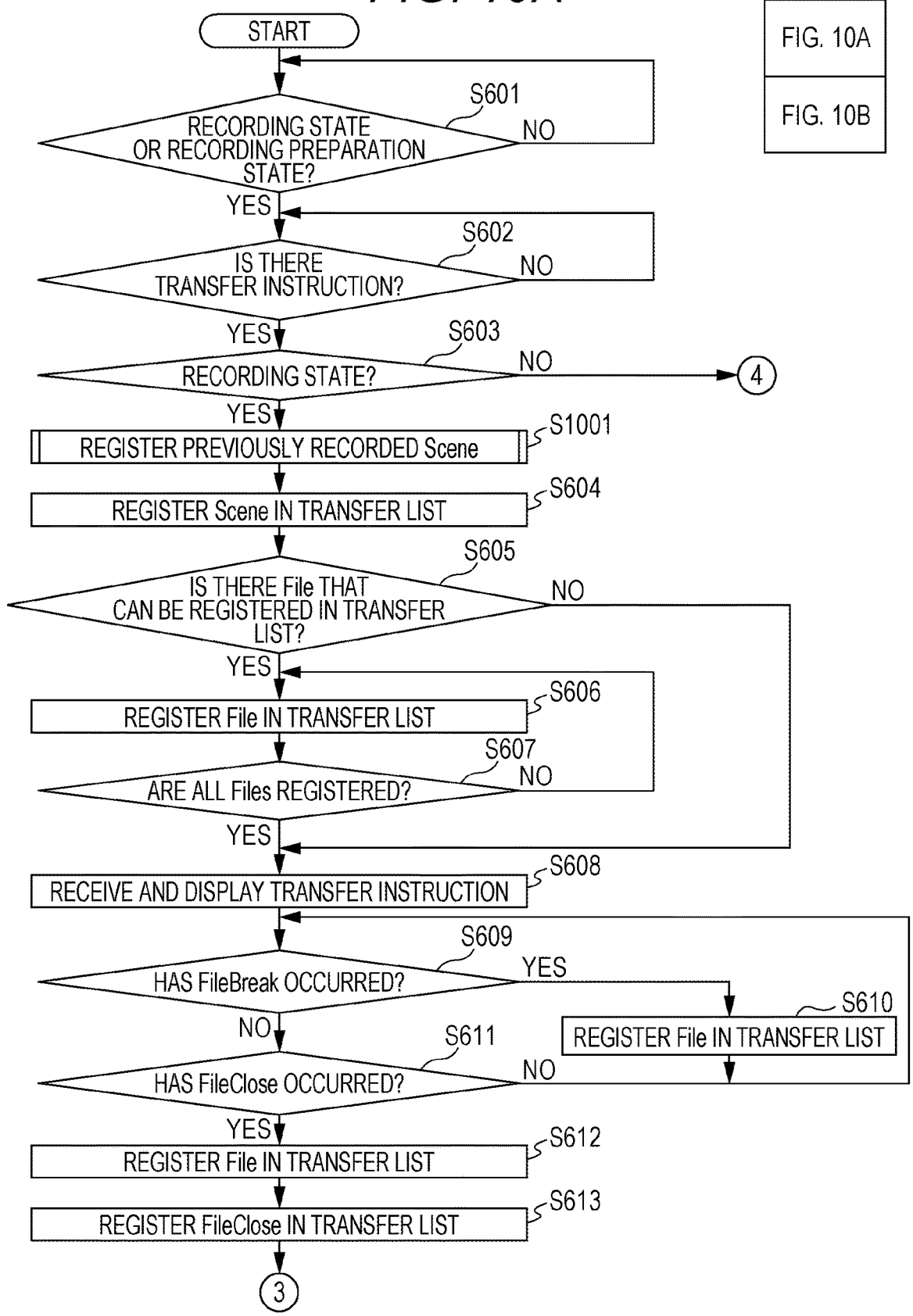

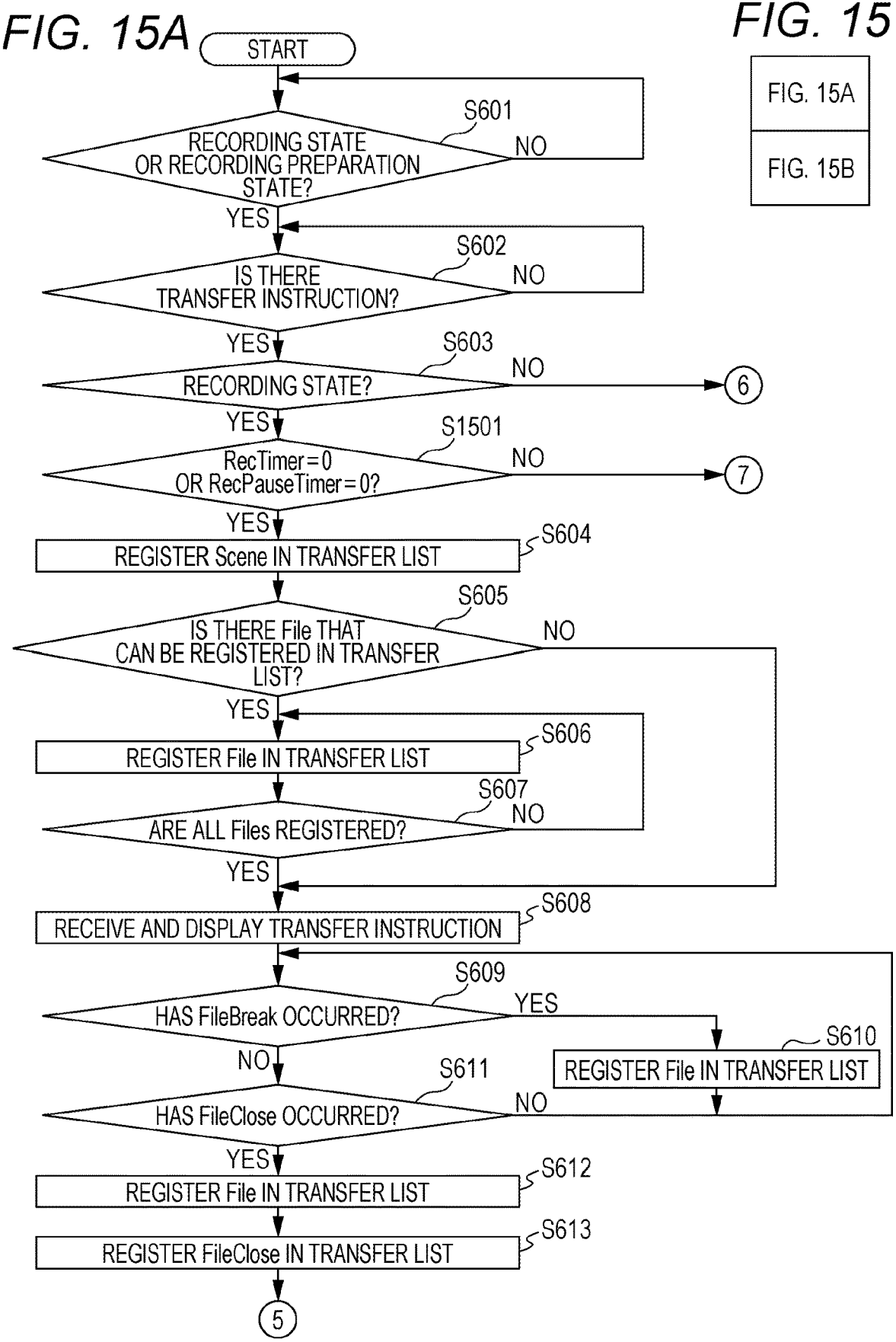

FIG. 16

| | 1601 | 1602 | 1603 |
|---|---|---|---|
| | SCENE NUMBER [0]: Scene #8 | RecPauseTimer[0] | RecTimer[0] |
| | SCENE NUMBER [1]: Scene #9 | RecPauseTimer[1] | RecTimer[1] |
| 1600 | SCENE NUMBER [2]: UNREGISTERED | RecPauseTimer[2] | RecTimer[2] |
| | SCENE NUMBER [3]: UNREGISTERED | RecPauseTimer[3] | RecTimer[3] |
| | SCENE NUMBER [4]: UNREGISTERED | RecPauseTimer[4] | RecTimer[4] |

IMAGE PROCESSING APPARATUS, CONTROL METHOD THEREOF, AND STORAGE MEDIUM STORING PROGRAM

BACKGROUND

Field of the Disclosure

The present disclosure relates to an image processing apparatus, a control method thereof, and a storage medium storing a program.

Description of the Related Art

In a digital video camera serving as an image processing apparatus, an image sensor converts an optical image into an electrical signal and the electrical signal is recorded on a removable recording medium, such as a built-in memory of a camera, a CF card, or an SD memory card, as image data. The recorded image data can be transferred to an external device, such as a personal computer (PC) or a mobile terminal (a smartphone or a tablet terminal) by using various communication units, such as a universal serial bus (USB) or a wireless local area network (LAN).

Recently, functions for transferring data via a wireless LAN have been in widespread to implement data transfer between a PC or mobile terminal and a video camera which has acquired the authentication of Wireless Fidelity (Wi-Fi). Data transfer systems such as File Transfer Protocol (FTP), HyperText Transfer Protocol (HTTP), and Real-time Transport Protocol (RTP) are generally employed.

In the case of transferring image data, such as moving image data obtained by a video camera, the FTP is often used and the FTP is also used as a file transfer protocol that operates at an upper layer of TCP/IP. The video camera operates as an FTP client and transfers image data, through an FTP command, to an external device, such as a PC or mobile terminal, which has an FTP server function.

Japanese Patent Laid-Open No. 2003-264729 discusses an electronic camera including a function for automatically transmitting an image file stored in a memory card during a period in which image capturing is not performed to a file server from a wireless communication interface unit.

Japanese Patent Laid-Open No. 2007-81739 discusses an image pickup apparatus that performs REC review display of captured images on an image display unit and displays a dialog for prompting a photographer to determine whether to execute image data transfer.

The technique discussed in Japanese Patent Laid-Open No. 2003-264729 has a problem that images, such as shaken images or defocused images, which are obtained when image capturing is unsuccessful, may also be automatically transferred against the photographer's will.

On the other hand, in the technique discussed in Japanese Patent Laid-Open No. 2007-81739, transfer designation is determined by pressing an REC review transfer switch and transfer of images through a communication unit is started. This prevents transfer of images captured unsuccessfully. However, when the photographer performs transfer designation, a transition of the state to the REC review display is required, which makes it difficult to set desired image data as a transfer target.

SUMMARY

According to an aspect of the present invention, an image processing apparatus that transfers recorded image data to an external device includes: a recording unit configured to record image data; an operation unit configured to instruct transfer of the image data; a control unit configured to perform control in such a manner that in a case where transfer of image data is instructed during recording of the image data, previously recorded image data is set as a transfer target when a predetermined period of time has not elapsed after recording of the previously recorded image data is stopped, and image data currently being recorded is set as the transfer target when the predetermined period of time has elapsed; and a communication unit configured to transfer the image data set as the transfer target by the control unit to the external device.

Further features of the present invention will become apparent from the following description of exemplary embodiments (with reference to the attached drawings).

BRIEF DESCRIPTION OF THE DRAWINGS

FIG. 1 is a block diagram illustrating a configuration of a video camera.

FIGS. 5A to 5H are conceptual diagrams each illustrating a transfer list and constituent elements thereof.

FIG. 6 divided into FIGS. 6A and 6B are flowcharts illustrating an operation of transfer list registration processing.

FIGS. 8A to 8C are diagrams each illustrating a relationship between a transfer instruction and a scene and file generation timing.

FIGS. 9A to 9E are conceptual diagrams each illustrating a transfer list and constituent elements thereof.

FIG. 10 divided into FIGS. 10A and 10B are flowcharts illustrating an operation of transfer list registration processing.

FIG. 15 divided into FIGS. 15A and 15B are flowcharts illustrating an operation of transfer list registration processing.

FIG. 16 is a diagram illustrating a transfer candidate list.

DESCRIPTION OF THE EMBODIMENTS

Figure 2A:
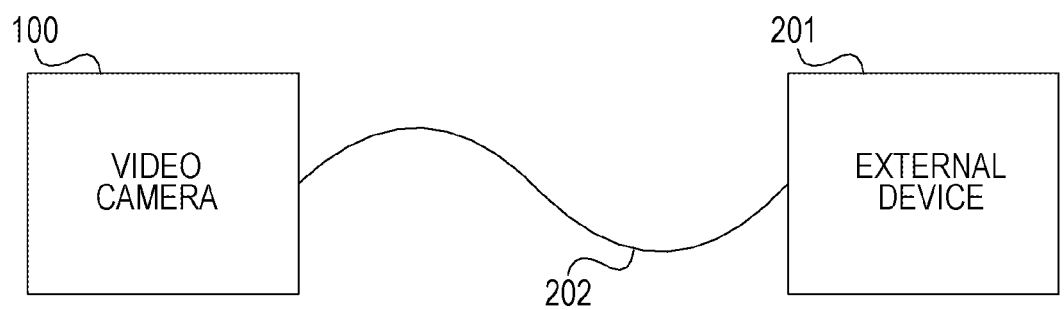
FIGS. 2A and 2B are schematic diagrams each illustrating a state where the video camera is connected to an external device.

Exemplary embodiments according to the present invention will be described below with reference to the drawings.

The present exemplary embodiments illustrate a case where a video camera is used as an image processing apparatus.

First Exemplary Embodiment

FIG. 1 is a block diagram illustrating an example of the configuration of a video camera 100.

The video camera 100 includes a lens 101, a complementary metal oxide semiconductor (CMOS) 102, a camera signal processing unit 103, a recording medium 104, a power supply 105, an operation unit 106, an input interface (I/F) 107, a read-only memory (ROM) 108, and a random access memory (RAM) 109. The video camera 100 also includes a coder decoder (CODEC) 110, an output I/F 111, a display unit 112, a central processing unit (CPU) 113, a communication control unit 114, a communication module 115, and a communication I/F 116. The video camera 100 inputs and outputs data through a data bus 117.

The lens 101 is an image pickup lens including a focus and a stop mechanism, and forms an optical image of a subject. The CMOS 102 is an image sensor and includes an A/D converter. The CMOS 102 converts an optical image into an analog electrical signal and then converts the analog electrical signal into a digital signal. The CMOS 102 is not particularly limited, and any image sensor, such as a charge coupled device image sensor (CCD), may also be used. The camera signal processing unit 103 performs resize processing, such as predetermined pixel interpolation and reduction, color conversion, various correction processing, and the like on the converted digital signal through the CPU 113 described below. The CODEC 110 performs compression encoding with a predetermined bit rate and format, or decoding of image compression-encoded data. Audio is not particularly illustrated. However, an audio signal can also be treated by processing substantially similar to processing for an image signal by replacing the lens 101 and the CMOS 102 by a microphone and replacing the display unit 112 by a speaker. In this case, at the time of image recording, the audio as well as images are recorded at the same time, and the CODEC 110 multiplexes the images and audio, thereby making it possible to generate image data with audio.

The recording medium 104 is a flash memory, such as an SD memory card or built-in memory, and records captured image data and audio data and information necessary for control of the CPU 113. The power supply 105 is an AC power supply or a battery, and supplies power necessary to each unit of the video camera 100. The operation unit 106 selects encoded image data recorded on the recording medium 104, and instructs transfer of the selected image data to an external device with which the communication control unit 114 is communicating. When the transfer is instructed, the number of a transfer target encoding file and the name of scenes of a transfer target encoding file group are stored in the RAM 109 through the CPU 113 according to a format in a transfer list illustrated in FIG. 5A. The operation unit 106 accepts an operation from a user, and outputs information about the received operation to the data bus 117 through the input I/F 107.

The ROM 108 stores a program for starting the video camera 100. When the electrical signal is supplied from the power supply 105 by the operation unit 106, the program stored in the ROM 108 is loaded into the RAM 109 and executed by the CPU 113. The RAM 109 functions as a work area for the CPU 113. The work area for the CPU 113 is not limited to the RAM 109, but instead may be, for example, an external recording device such as a hard disk device which is not illustrated. The CODEC 110 reproduces image data and audio data recorded on the RAM 109 or the recording medium 104. The reproduced image data is displayed on the display unit 112. The reproduced audio data is supplied to the speaker and output.

The output I/F 111 outputs a display signal for display on the display unit 112 based on display data such as Graphical User Interface (GUI) generated by the CPU 113 according to a program. The communication control unit 114 transmits and receives control data, image data, and audio data to and from an external device, such as a File Transfer Protocol (FTP) server, through the communication module 115 and the communication I/F 116.

The CPU 113 controls the entire video camera 100. Further, the CPU 113 manages information about recording of scenes and files during recording of images. Accordingly, the CPU 113 is capable of performing general-purpose processing such as file processing, such as FileBreak and FileClose described below, acquisition of information about the file processing, control of a recording operation of a video camera (change of a recording state and a recording preparation state), management of an information list, and update processing.

Figure 2B:
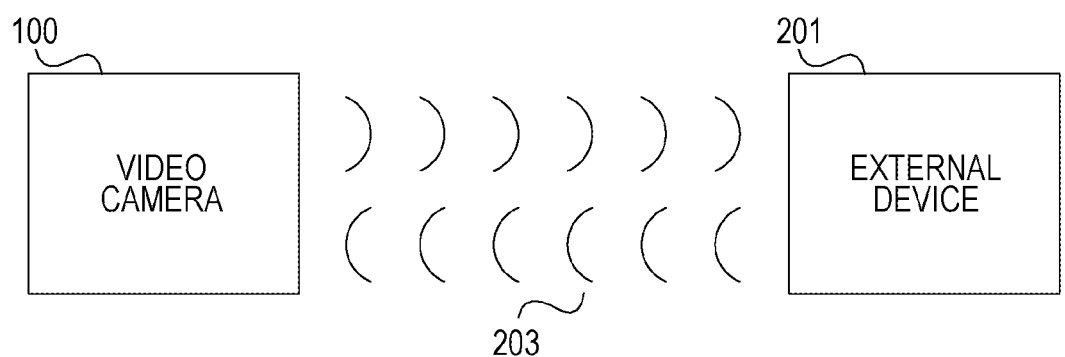

FIGS. 2A and 2B are schematic diagrams each illustrating an example of a state where the video camera 100 and an external device 201 are connected to each other.

FIG. 2A illustrates that the video camera 100 is connected to the external device 201 through a wired communication medium 202. The external device 201 may be a device that directly communicates with the video camera 100, or a device that is connected through a relay apparatus such as a network hub. The wired communication medium 202 is a wired connection cable that connects the video camera 100 and the external device 201 to each other. In FIG. 2A, the video camera 100 and the external device 201 can communicate with each other via a wired local area network (LAN), a universal serial bus (USB), or the like.

FIG. 2B illustrates that the video camera 100 is connected to the external device 201 via a wireless communication 203. The external device 201 may a device that directly performs wireless communication with the video camera 100, or a device that is connected through a relay wireless device such as an access point. In FIG. 2B, the video camera 100 and the external device 201 can perform wireless communication via Wi-Fi or Bluetooth (registered trademark).

Figure 3:
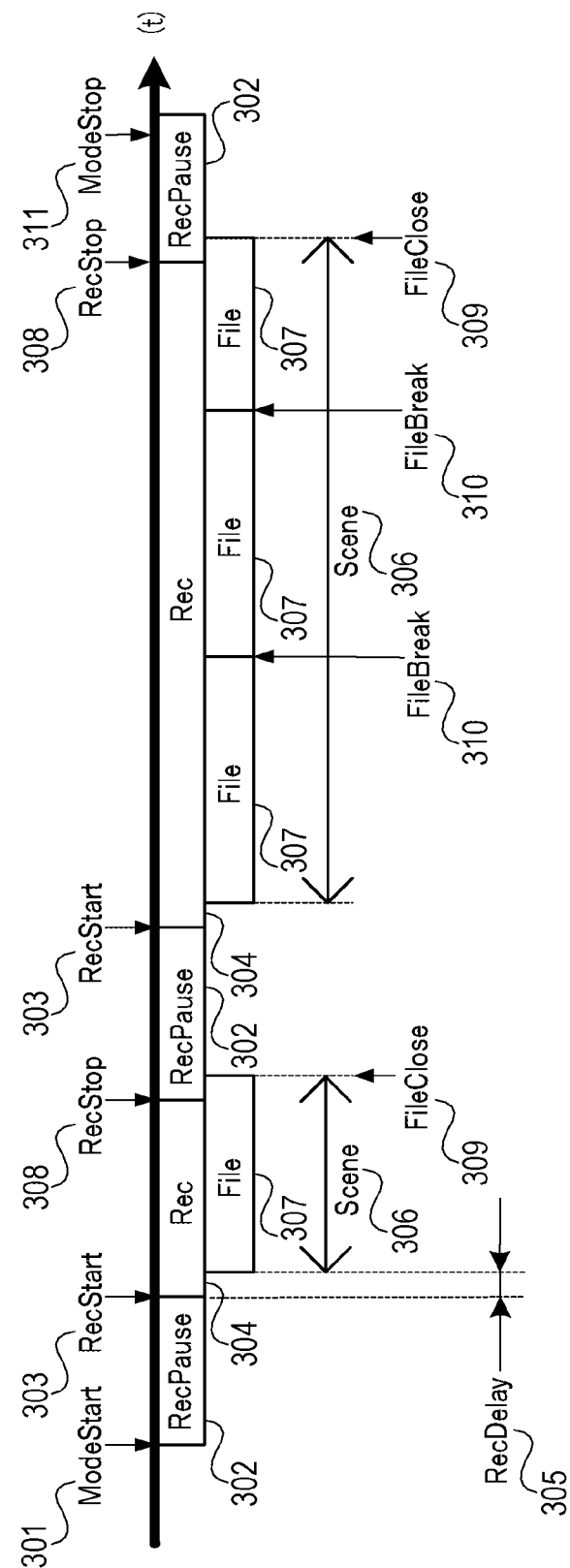
FIG. 3 is a diagram illustrating a recording operation state and a file generation timing.

FIG. 3 is a conceptual diagram illustrating a recording operation state and a file generation timing of the video camera 100 and a relationship between scenes and files.

In FIG. 3, (t) represents a time axis where time progresses rightward.

ModeStart 301 indicates an input operation of a user interface (hereinafter "UI") for the operation unit 106 to cause the video camera 100 to transit to the recording preparation state. When the input operation is carried out, the video camera 100 transits to the recording preparation state.

RecPause 302 indicates the recording preparation state of the video camera 100. The recording preparation state is a state where the video camera is allowed to immediately transit to the recording operation when RecStart, which is an operation performed by the operation unit 106, is instructed. The recording preparation state is a recording interrupted state.

RecStart 303 indicates an input operation of the UI for the operation unit 106 to cause the video camera 100 to transit to the recording state. When the video camera 100 transits to the recording state, the signal input through the lens 101 and the CMOS 102 is encoded by the CODEC 110 into a file format to be recorded on the recording medium 104, and is sequentially stored in the RAM 109. When the capacity of stored file has reached an arbitrary capacity, the file is recorded on the recording medium 104. This processing is sequentially carried out until the input operation of RecStop described below is performed.

Rec 304 indicates the recording state of the video camera 100. The recording state indicates a state where RecStart 303 is input by the operation unit 106, and the video camera 100 carries out the recording operation by performing the above-described processing.

RecDelay 305 indicates a time difference after RecStart 303 is instructed by the operation unit 106 and the video camera 100 starts the recording operation before recording of image data on the recording medium 104 is actually started. This time increases or decreases depending on the bit rate of images to be recorded, or the arbitrary capacity for storing data in the RAM 109. A similar time difference is generated after the image data recording operation is input by RecStop described below before the recording operation is actually completed.

Scene 306 indicates a recording unit for recording images in the video camera 100. The recording unit is a set of files to be recorded between RecStart 303 and RecStop described below. Scene 306 is not the same as a file. In view of the file format of the recording medium 104, when the data (file) to be recorded on the recording medium 104 has a data size equal to or larger than a file upper limit capacity of the file format, it is necessary to divide the file. This operation is referred to as FileBreak. The files divided by FileBreak are treated as one scene. Scene 306 is provided with a number, such as Scene #1, Scene #2 . . . , every time RecStart 303 is instructed.

File 307 is an image file to be recorded on the recording medium 104. When the data accumulated in the RAM 109 has reached the arbitrary capacity, storing of the data in the recording medium 104 as a file is started in response to RecStart 303. In the recording operation, as the image data is sequentially loaded into the RAM 109, the amount of stored data as File 307 gradually increases. File 307 is incomplete data until FileClose described below or File-Break is carried out, which makes it difficult to load data from other processing. The file is provided with a number, such as File #1, File #2 . . . , every time the file is completed by FileClose or FileBreak.

RecStop 308 indicates an input operation of the UI for the operation unit 106 to cause the video camera 100 to interrupt the recording state and transit to the recording preparation state.

FileClose 309 indicates file processing for completing File 307, which is sequentially recorded on the recording medium 104 by the recording operation of the video camera 100, as a file. When this processing is carried out, File 307 can be loaded or edited from other processing.

FileBreak 310 indicates file processing for recording divided files when a file having a size equal to or larger than a specific size is stored in the recording medium 104 in view of the file format of the recording medium 104. This processing is automatically performed by the CPU 113 in the video camera 100 by identifying the file format of the recording medium 104. The user uses the operation unit 106 to input RecStart 303 only once, thereby allowing the CPU 113 to load the file for a certain recording time or longer until the file format upper limit of the recording medium 104 is reached. At this time, the CPU 113 completes the file by FileBreak 310 and starts to generate a new file.

ModeStop 311 indicates an input operation of the UI for the operation unit 106 to cause the recording processing of the video camera 100 to transit to an end state.

FIGS. 4A to 4E are diagrams each illustrating a relationship between a transfer instruction in each recording operation state of the video camera 100 and a scene and file generation timing.

Figure 4A:
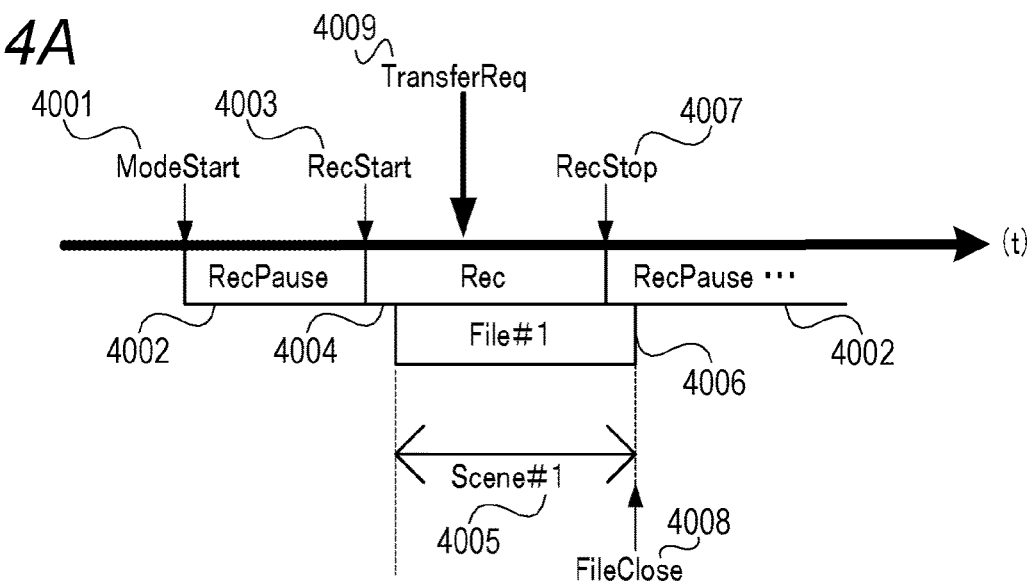
FIGS. 4A to 4E are diagrams each illustrating a relationship between a transfer instruction and a scene and file generation timing.

FIG. 4A is a conceptual diagram illustrating an example of a relationship between a scene and file generation timing and a recording operation state when the video camera 100 in the recording operation state is instructed by the operation unit 106 to transfer a scene being recorded to the external device.

ModeStart 4001 indicates an input operation of the UI for the operation unit 106 to cause the video camera 100 to transit to the recording preparation state. When this input operation is carried out, the video camera 100 transits to RecPause 4002.

RecPause 4002 indicates the recording preparation state of the video camera 100.

RecStart 4003 indicates an input operation of the UI for the operation unit 106 to cause the video camera 100 to transit to the recording state.

Rec 4004 indicates the recording state of the video camera 100.

Scene #1 (4005) is a recording unit for recording images in the video camera 100. Scene #1 (4005) is provided with the number "#1" assuming that RecStart 4003 carries out a first recording operation on the recording medium 104.

File #1 (4006) is an image file to be recorded on the recording medium 104. Like Scene #1 (4005), File #1 (4006) is provided with the number "#1" assuming that a first recording operation is performed on the recording medium 104.

RecStop 4007 indicates an input operation of the UI for the operation unit 106 to cause the video camera 100 to interrupt the recording state. The video camera 100 which is instructed to carry out RecStop 4007 completes File 4006, which has been recorded and incomplete, as a file by FileClose 4008.

FileClose 4008 is file processing for completing File 4006, which is sequentially recorded on the recording medium 104 by the recording operation of the video camera 100, as a file.

TransferReq 4009 indicates an input operation of the UI for the operation unit 106 to instruct transfer of Scene 4005 being recorded to the external device. The actual processing of TransferReq 4009 is described below.

Figure 4B:
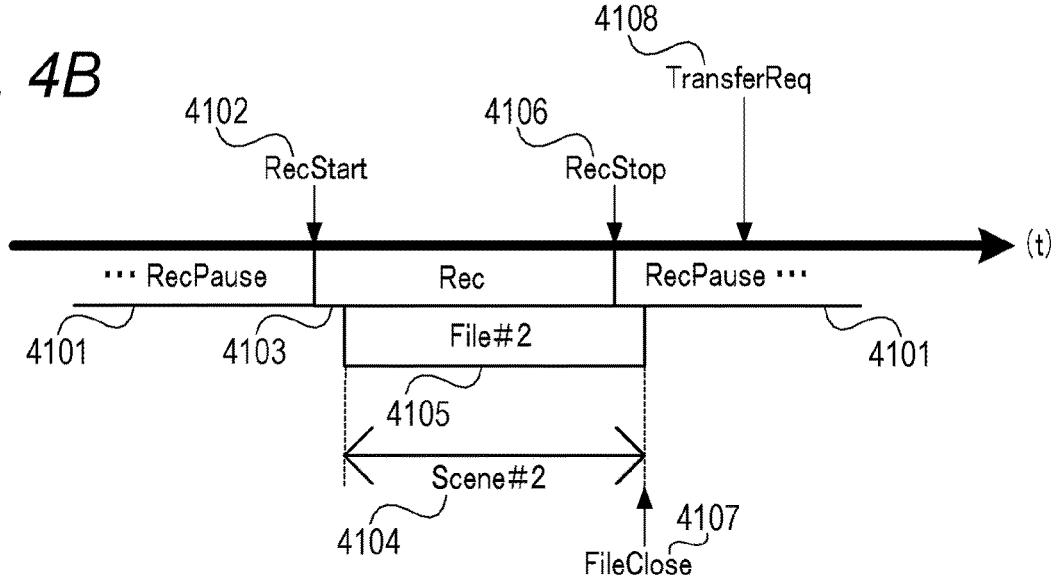

FIG. 4B is a conceptual diagram illustrating an example of a relationship between scenes and files and a recording operation state when the operation unit 106 in the recording preparation state instructs the video camera 100 to transfer the recorded scene to the external device after the video camera 100 completes the recording operation.

RecPause 4101 indicates the recording preparation state of the video camera 100.

RecStart 4102 indicates an input operation of the UI for the operation unit 106 to cause the video camera 100 to transit to the recording state.

Rec 4103 indicates the recording state of the video camera 100.

Scene #2 (4104) is a recording unit for recording images in the video camera 100. Scene #2 (4104) is provided with the number "#2" assuming that RecStart 4102 carries out a second recording operation on the recording medium 104.

File #2 (4105) is an image file to be recorded on the recording medium 104. Like Scene #2 (4104), File #2

(4105) is provided with the number "#2" assuming that a second generated file recording is performed on the recording medium 104.

RecStop 4106 indicates an input operation of the UI for the operation unit 106 to cause the video camera 100 to interrupt the recording state. The video camera 100 which is instructed to carry out RecStop 4106 completes File #2 (4105), which has been recorded and incomplete, as a file by FileClose 4107.

FileClose 4107 is file processing for completing File #2 (4105), which is sequentially recorded on the recording medium 104 by the recording operation of the video camera 100, as a file.

TransferReq 4108 indicates an input operation of the UI for the operation unit 106 to instruct transfer of Scene #2 (4104), recording of which has been completed, to the external device. The actual processing of TransferReq 4108 is described below.

Figure 4C:
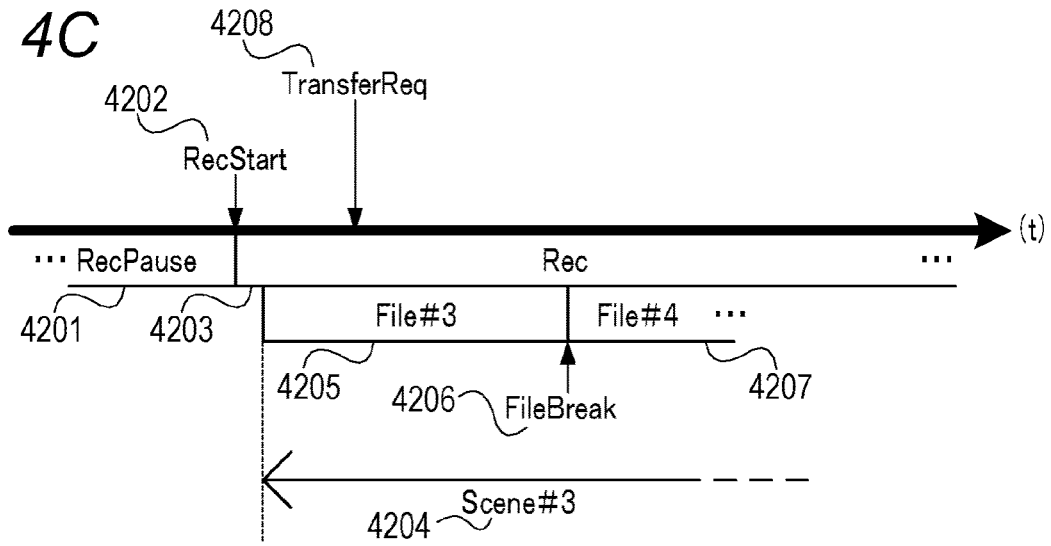

FIG. 4C is a conceptual diagram illustrating an example of a relationship between scenes and files and a recording operation state when the video camera 100 in the recording operation state is instructed by the operation unit 106 to transfer a scene being recorded to the external device. In this case, FileBreak occurs after the video camera is instructed to transfer the scene before occurrence of FileBreak.

RecPause 4201 indicates the recording preparation state of the video camera 100.

RecStart 4202 indicates an input operation of the UI for the operation unit 106 to cause the video camera 100 to transit to the recording state.

Rec 4203 indicates the recording state of the video camera 100.

Scene #3 (4204) is a recording unit for recording images in the video camera 100. Scene #3 (4204) is provided with the number "#3" assuming that RecStart 4202 carries out a third recording operation on the recording medium 104. FileBreak operation is carried out on Scene #3 (4204) during recording of File #3 (4205). In this case, after completion of File #3 (4205) as a file, a new File #4 is generated and these files are included in Scene #3 (4204) to be processed.

File #3 (4205) is an image file to be recorded on the recording medium 104. Like Scene #3 (4204), File #3 (4205) is provided with the number "#3" assuming that a third generated file recording is performed on the recording medium 104.

FileBreak 4206 indicates processing for dividing a file because File #3 (4205) reaches the upper limit of the file capacity in the file system of the recording medium 104. Processing for completing File #3 (4205) as a file and generating a new File #4 (4207) continue recording is carried out.

File #4 (4207) is an image file that is generated to continue recording after occurrence of FileBreak 4206, because File #3 (4205) reaches the upper limit of the file capacity in the file system of the recording medium 104.

TransferReq 4208 indicates an input operation of the UI for the operation unit 106 to instruct transfer of Scene #3 (4204) being recorded to the external device. The actual processing of TransferReq 4208 is described below.

Figure 4D:
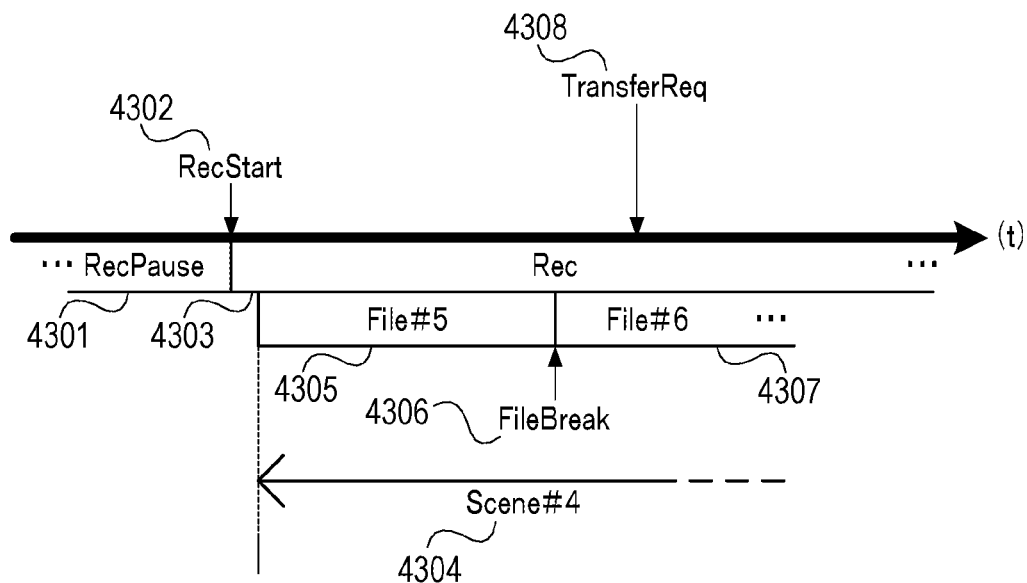

FIG. 4D is a conceptual diagram illustrating an example of a relationship between scenes and files and a recording operation state when the video camera 100 in the recording operation state is instructed by the operation unit 106 to transfer a scene being recorded to the external device. In this case, the transfer is instructed after occurrence of FileBreak.

RecPause 4301 indicates the recording preparation state of the video camera 100.

RecStart 4302 indicates an input operation of the UI for the operation unit 106 to cause the video camera 100 to transit to the recording state.

Rec 4303 indicates the recording state of the video camera 100.

Scene #4 (4304) is a recording unit for recording images in the video camera 100. Scene #4 (4304) is provided with the number "#4" assuming that RecStart 4302 carries out a fourth recording operation on the recording medium 104. The FileBreak operation is carried out on Scene #4 (4304) during recording of File #5 (4305). In this case, after completion of File #5 (4305) as a file, a new File #6 is generated and these files are included in Scene #4 (4304) to be processed.

File #5 (4305) is an image file to be recorded on the recording medium 104. File #5 (4305) is provided with the number "#5" assuming that a fifth generated file recording is performed on the recording medium 104.

FileBreak 4306 indicates processing for dividing a file because File #5 (4305) reaches the upper limit of the file capacity in the file system of the recording medium 104. Processing for completing File #5 (4305) as a file and generating a new File #6 (4307) to continue recording is carried out.

File #6 (4307) is an image file that is generated to continue recording after occurrence of FileBreak 4306, because File #5 (4305) reaches the upper limit of the file capacity in the file system of the recording medium 104.

TransferReq 4308 indicates an input operation of the UI for the operation unit 106 to instruct transfer of Scene #4 (4304) being recorded to the external device. The actual processing of TransferReq 4308 is described below.

Figure 4E:
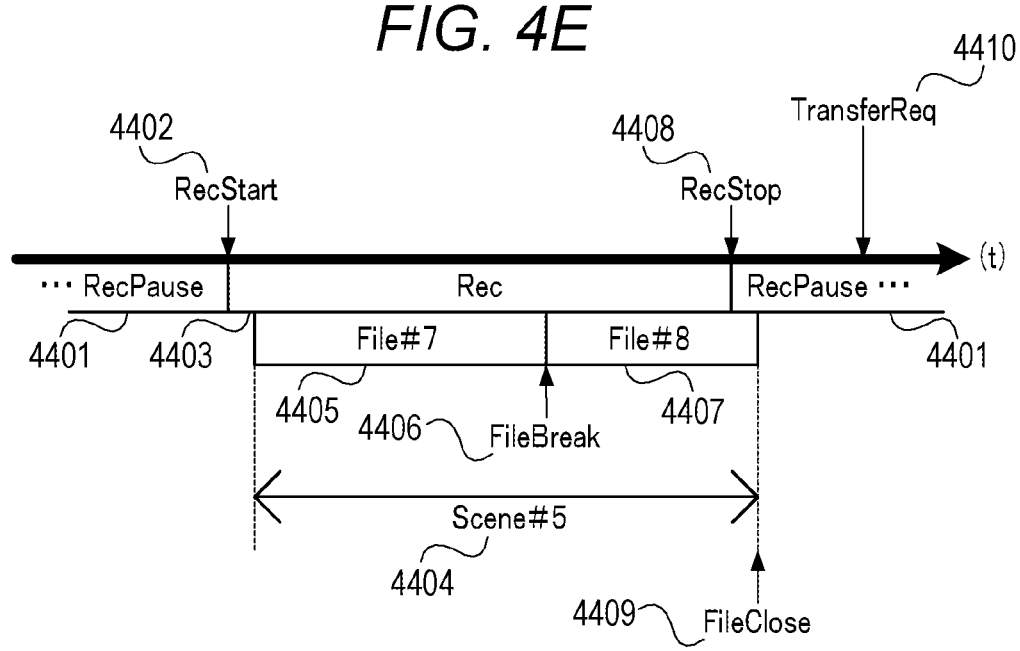

FIG. 4E is a conceptual diagram illustrating an example of a relationship between scenes and files and a recording operation state when the video camera 100 in the recording preparation state is instructed by the operation unit 106 to transfer the recorded scene to the external device. In this case, the transfer is instructed after completion of the recording operation involving the FileBreak operation.

RecPause 4401 indicates the recording preparation state of the video camera 100.

RecStart 4402 indicates an input operation of the UI for the operation unit 106 to cause the video camera 100 to transit to the recording state.

Rec 4403 indicates the recording state of the video camera 100.

Scene #5 (4404) is a recording unit for recording images in the video camera 100. Scene #5 (4404) is provided with the number "#5" assuming that RecStart 4402 carries out a fifth recording operation on the recording medium 104. The FileBreak operation is carried out on Scene #5 (4404) during recording of File #7 (4405). In this case, after completion of File #7 (4405) as a file, a new File #8 is generated and these files are included in Scene #5 (4404) to be processed.

File #7 (4405) is an image file to be recorded on the recording medium 104. File #7 (4405) is provided with the number "#7" assuming that a seventh generated file recording is performed on the recording medium 104.

FileBreak 4406 indicates processing for dividing a file because File #7 (4405) reaches the upper limit of the file capacity in the file system of the recording medium 104. Processing for completing File #7 (4405) as a file and generating a new File #8 (4407) to continue recording is carried out.

File #8 (4407) is an image file that is generated to continue recording after occurrence of FileBreak 4406, because File #7 (4405) reaches the upper limit of the file capacity in the file system of the recording medium 104.

RecStop 4408 indicates an input operation of the UI for the operation unit 106 to cause the video camera 100 to interrupt the recording state. The video camera 100 which is instructed to carry out RecStop 4408 completes File #8 (4407), which has been recorded and incomplete, as a file by FileClose 4409.

FileClose 4409 indicates file processing for completing File #8 (4407), which is sequentially recorded on the recording medium 104 by the recording operation of the video camera 100, as a file.

TransferReq 4110 indicates the UI for the operation unit 106 to instruct transfer of Scene #5 (4404), recording of which has been completed, to the external device. The actual processing is described below.

FIGS. 5 is a conceptual diagram illustrating an example of transfer lists and constituent elements thereof in the video camera 100.

Figure 5A:
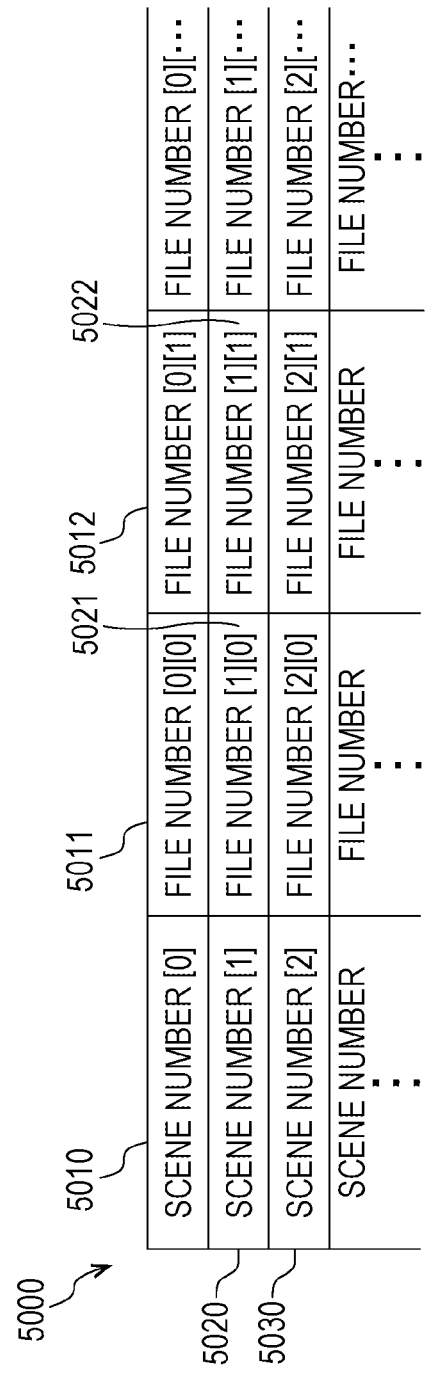

FIG. 5A is a table illustrating a configuration example of a transfer list 5000.

Scene information and file information can be registered in the transfer list. Lists 5010, 5020, 5030 . . . are scene information registration tables. The numbers of scenes that are instructed to be transferred are registered in each scene information registration table. The number of tables is determined depending on the number of registered scenes that are instructed to be transferred. In the example illustrated in FIG. 5B, five scene information registration tables [0] to [4] are provided. In other words, five scenes can be instructed to be transferred in the present exemplary embodiment. In this case, however, if the transfer of scenes registered in a certain transfer list is completed, the table is reset to an available state, so that transfer of scenes can be instructed again.

Lists 5011, 5012 . . . are file information registration tables for registering file information constituting the scenes registered in the list 5010 with the scene number [0]. Similarly, the file information registration table constituting the scenes registered in the list 5020 with the scene number [1] is followed by lists 5021, 5022 . . . . The number of tables is determined depending on a maximum number of files constituting one scene. In the example illustrated in FIG. 5B, three file information registration tables are provided as lists 5101, 5102, and 5103. In the present exemplary embodiment, three files can be registered for one scene. The number of scene information registration tables and the number of file information registration tables are not limited to the numbers described above and can be changed depending on the system.

Figure 6B:
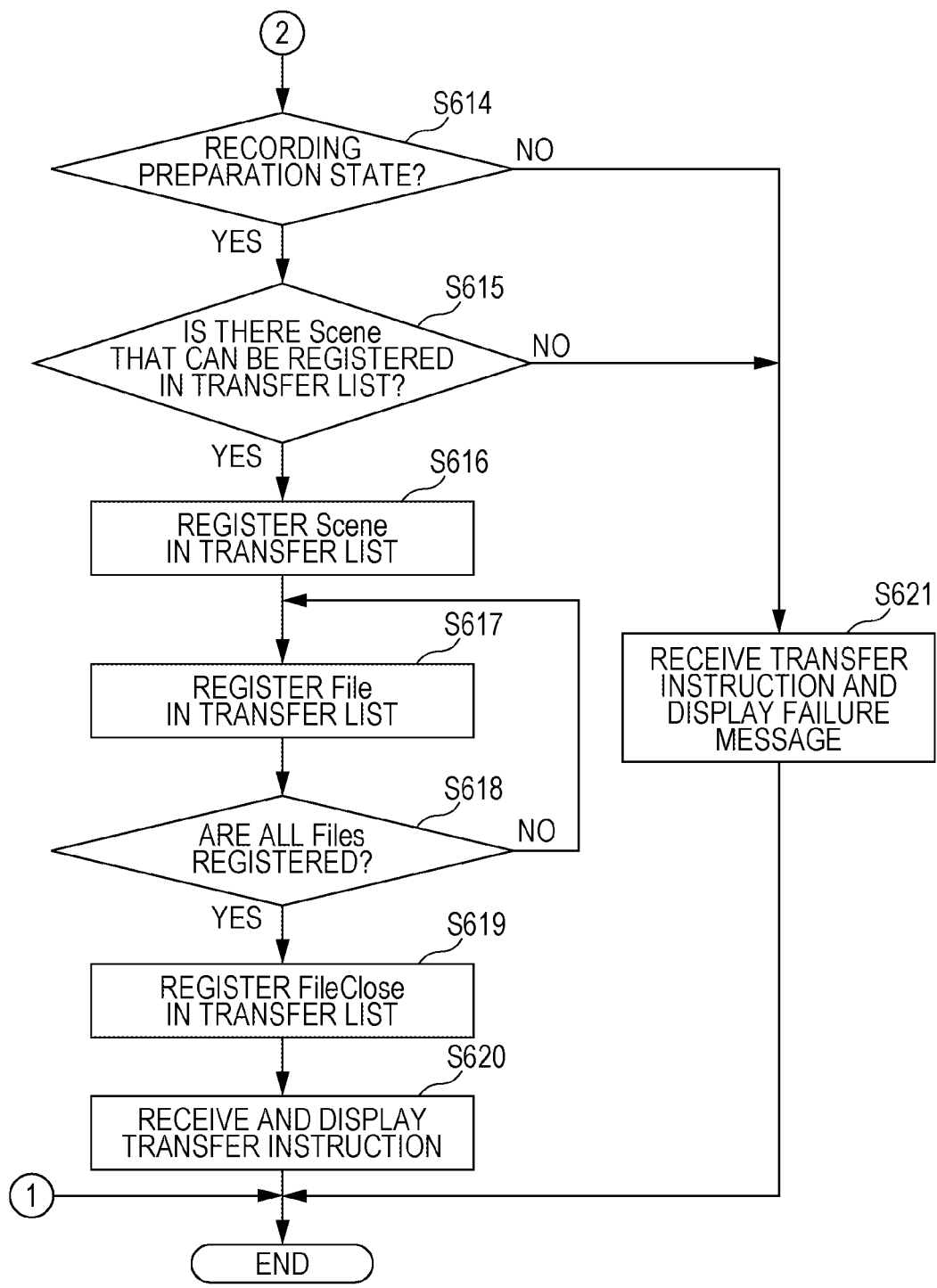

FIGS. 6A and 6B are flowcharts illustrating an example of the operation of transfer list registration processing performed by the video camera 100. This flowchart is implemented in such a manner that the CPU 113 executes programs recorded on the ROM 108 and the like.

The video camera 100 determines the presence or absence of the recording operation state and FileBreak when TransferReq, which is the transfer instruction described above with reference to FIGS. 4A to 4E, is received, and registers scene information in the transfer list according to the determination results. The video camera 100 transfers the scene to the external device according to the transfer list.

The operation of the video camera 100 when TransferReq is instructed by the operation unit 106 will be described with reference to FIGS. 4A to 6B. The user can cause the video camera 100 to transit to the recording preparation state through the operation unit 106 asynchronously with the processing of FIGS. 6A and 6B. The user can also cause the video camera 100 to arbitrarily transit to the recording preparation state or the recording state. In FIGS. 4A to 4E, the transition to the recording preparation state corresponds to ModeStart or RecStop in each figure, and the transition to the recording state corresponds to RecStart.

In S601, the CPU 113 determines whether the video camera is in the recording state or the recording preparation state. If the video camera is not in the recording state or the recording preparation state, the processing returns to S601 to repeat the processing. If the video camera is in the recording state or the recording preparation state, the processing proceeds to S602.

In S602, the CPU 113 monitors the input I/F 107 and determines whether there is a transfer instruction from the operation unit 106. Specifically, TransferReqs 4009, 4108, 4208, 4308, and 4410 illustrated in FIGS. 4A to 4E correspond to the transfer instruction. If there is no transfer instruction, the processing returns to S602 to repeat the processing. If there is a transfer instruction, the processing proceeds to S603.

In S603, the CPU 113 determines whether the video camera is in the recording state (Rec state). If the video camera is not in the recording state, the processing proceeds to S614. If the state is the recording state, the processing proceeds to S604.

In S604, the CPU 113 registers scene information to be transferred in the transfer list. The processing will now be described with reference to FIGS. 4A and 5B. When TransferReq 4009 illustrated in FIG. 4A is received, the first scene recording is performed and thus all the transfer lists illustrated in FIG. 5B are unregistered. The CPU 113 detects the reception of TransferReq 4009, thereby acquiring the number of the scene instructed to be transferred and registering the acquired scene number in the list 5100. In this case, the number of the scene instructed to be transferred is Scene #1 (4005) illustrated in FIG. 4A, and Scene #1 is registered in the list 5100 illustrated in FIG. 5B. Also, in the examples illustrated in FIGS. 4C and 4D, processing for registering the scene information in the transfer list is performed so that Scene #3 is registered in a list 5320 illustrated in FIG. 5D and Scene #4 is registered in a list 5530 illustrated in FIG. 5F.

In S605, the CPU 113 determines whether there is a registerable file in the transfer list. The CPU 113 determines whether there is a registerable file based on the scene information being currently recorded. The scene information includes information about files constituting a scene, which enables determination as to whether the scene is formed of a plurality of files by FileBreak. At the time when TransferReq 4009 illustrated in FIG. 4A is received, File #1 (4006) is in an incomplete state, and thus cannot be registered in the transfer list. Similarly, File #3 (4205) illustrated in FIG. 4C cannot be registered in the transfer list. Accordingly, if there is no registrable file, the processing proceeds to S608.

At the time when TransferReq 4308 illustrated in FIG. 4B is received, File #6 (4307) is in an incomplete state, while File #5 (4305) is brought into a complete state by the processing of FileBreak 4306, and thus File #5 (4305) can be registered in the transfer list. Accordingly, if there is a registrable file, the processing proceeds to S606.

In S606, the CPU 113 registers information about the file to be transferred to the transfer list. This processing will now be described with reference to FIGS. 4D and 5F. FIG. 4D illustrates a state where Scene #1, Scene #2, and Scene #3 are already registered in the transfer list, and Scenes #1 to #3 are registered as scene information in Lists 5500, 5510, and 5520, respectively, which are illustrated in FIG. 5F. The CPU 113 registers File #5 in a list 5531 of the list 5530 illustrated in FIG. 5F which has been unregistered before execution of S606.

In S607, the CPU 113 determines whether there is other file information to be registered in the transfer list at that time. It is also assumed that only File #5 (4305) is completed as a file when TransferReq 4308 illustrated in FIG. 4D is received, but a plurality of files is generated by FileBreak. Accordingly, the CPU 113 determines whether all pieces of file information have been registered in the transfer list. If there is file information to be registered, the processing returns to S606. If all pieces of file information have been registered, the processing proceeds to S608.

In S608, the CPU 113 receives TransferReq and notifies the user of the registration of all files in the transfer list through the display unit 112.

In S609, the CPU 113 determines whether FileBreak has occurred in the file included in the scene being recorded. The CPU 113 detects an occurrence of FileBreak when the image file to be recorded on the recording medium 104 reaches the maximum file size of the file format of the recording medium 104, and divides the file. Each of FileBreaks 4206, 4306, and 4406 illustrated in FIGS. 4C to 4E correspond to FileBreak that has occurred. If the occurrence of FileBreak is detected, the processing proceeds to S610. If the occurrence of FileBreak is not detected, the processing proceeds to S611.

In S610, the CPU 113 detects the occurrence of FileBreak, thereby updating the transfer list. In this case, upon occurrence of FileBreak 4206 illustrated in FIG. 4C, File #3 (4205) is registered in the transfer list. While a list 5322 illustrated in FIG. 5D is unregistered before execution of S610, the CPU 113 acquires information about the file completed by FileBreak processing and registers the acquired file information in a list 5422 illustrated in FIG. 5E. Similarly, upon occurrence of FileBreak 4306 illustrated in FIG. 4D, the CPU 113 registers file information about File #5 (4305) in the list 5531 illustrated in FIG. 5F.

In S611, the CPU 113 determines whether FileClose has occurred. When RecStop is input by the operation unit 106, the CPU 113 performs FileClose on the file being recorded. In this case, each of FileCloses 4008 and 4409 illustrated in FIGS. 4A and 4E corresponds to FileClose. If FileClose has not occurred, the processing returns to S609. If FileClose has occurred, the processing proceeds to S612.

In S612, the CPU 113 registers, in the transfer list, information about the file that is in the complete state after performing FileClose on the file being recorded. In this case, File #1 (4006) is brought into the complete state by FileClose 4008 illustrated in FIG. 4A, and thus the file can be registered in the transfer list. The CPU 113 registers the file information about File #1 that is unregistered before execution of S612 in the list 5101 illustrated in FIG. 5B. Further, File #8 (4407) is brought into the complete state by FileClose 4409 illustrated in FIG. 4E, so that the file can be registered in the transfer list. The CPU 113 registers the file information about File #8 that is unregistered before execution of S612 in a list 5742 illustrated in FIG. 5H.

In S613, the CPU 113 registers FileClose indicating that the scene has completed in the transfer list. After the registration of the file information in the transfer list, the CPU 113 registers information indicating that the scene has been completed in the transfer list. In this case, lists 5102, 5212, and 5743 illustrated in FIGS. 5B, 5C, and 5H, respectively, correspond to FileClose. When S613 is completed, the transfer list registration processing ends.

On the other hand, in S614, the CPU 113 determines whether the video camera is the recording preparation state (RecPause state). If the video camera is in the recording preparation state, the processing proceeds to S615. If the video camera is not in the recording preparation state, the processing proceeds to S621.

In S615, the CPU 113 determines whether there is a scene that can be registered in the transfer list. Specifically, if there is a preceding recorded scene, the CPU 113 determines that there is a scene that can be registered, and if there is no preceding recorded scene, the CPU 113 determines that there is no scene that can be registered. The CPU 113 performs recording control of the recording medium 104, thereby enabling determination as to whether there is a preceding recorded scene. If there is a registerable scene in the transfer list, the processing proceeds to S616. If there is no registrable scene, the processing proceeds to S621.

In S616, the CPU 113 registers scene information to be transferred in the transfer list. This processing will now be described with reference to FIGS. 4B and 5C. When the reception of TransferReq 4108 illustrated in FIG. 4B is detected, the number of the scene that is instructed to be transferred is acquired and registered in a list 5210 illustrated in FIG. 5C. In this case, the number of the scene that is instructed to be transferred is Scene #2 (4104) illustrated in FIG. 4B, and Scene #2 is registered in the list 5210 illustrated in FIG. 5C. Also, in FIG. 4E, processing for registering scene information in the transfer list is performed, and in FIG. 5H, Scene #5 is registered in a list 5740.

In S617, the CPU 113 registers file information to be transferred in the transfer list. This processing is similar to the processing of S606.

The processing will now be described with reference to FIGS. 4B, 4E, 5C, and 5H. FIG. 4B illustrates a state where Scene #1 is already registered in the transfer list, and Scene #1 is registered as scene information in a list 5200 illustrated in FIG. 5C. Similarly, FIG. 4E illustrates a state where Scenes #1 to #4 are registered, and Scenes #1 to #4 are registered as scene information in lists 5700, 5710, 5720, and 5730 illustrated in FIG. 5H.

The processing from S614 is described with reference to FIG. 4B. As illustrated in FIG. 4B, when the CPU 113 is in the period of RecPause 4101 indicating the recording preparation state upon receiving TransferReq 4108, the processing proceeds to S615. In S615, the CPU 113 determines that there is a registrable scene in the transfer list because FileClose 4107 is carried out immediately before as illustrated in FIG. 4B, and the processing proceeds to S616. In S616, the CPU 113 registers the scene information about Scene #2 (4104) illustrated in FIG. 4B in the transfer list, and the processing proceeds to S617. In S617, File #2 (4105), which constitutes Scene #2 (4104) illustrated in FIG. 4B, is present in a complete state, the CPU 113 registers File #2 as file information in a list 5211 illustrated in FIG. 5C, and then the processing proceeds to S618.

In S618, the CPU 113 determines whether there is other file information to be registered in the transfer list. If there is unregistered file information, the processing returns to S617. If the file information has been registered, the processing proceeds to S619. In this case, in FIG. 4E, File #7 (4405) and File #8 (4407) are present in a complete state when TransferReq 4410 is received. In this case, as illustrated in FIG. 5H, when S617 is carried out for the first time, the CPU 113 registers File #7 in a list 5741. Next, in S618, the CPU 113 determines that File #8 (4407) is not registered and there is file information to be registered. Accordingly, the processing returns to S617 and File #8 is registered in the list 5742 illustrated in FIG. 5H.

In S619, the CPU 113 registers FileClose indicating that the scene has completed in the transfer list. In this case, since video camera 100 is in the recording preparation state and only the data on which FileClose has been carried out is present, there is no processing for monitoring FileClose. This processing corresponds to the processing for registering FileClose in the list 5212 illustrated in FIG. 5C when TransferReq 4108 illustrated in FIG. 4B is instructed. This processing also corresponds to the processing for registering FileClose in the list 5743 illustrated in FIG. 5H when TransferReq 4410 illustrated in FIG. 4E is instructed.

In S620, the CPU 113 receives TransferReq, thereby notifying the user of the registration of all files in the transfer lists through the display unit 112. When S620 is completed, the transfer list registration processing ends.

On the other hand, in S621, the CPU 113 notifies the user that the registration processing in the transfer list is unsuccessful. Although the transfer is instructed by the operation unit 106, there is no scene to be registered in the transfer list and transfer processing is not carried out. Accordingly, the CPU 113 notifies the user to that effect through the display unit 112. When S621 is completed, the transfer list registration processing ends.

Figure 7:
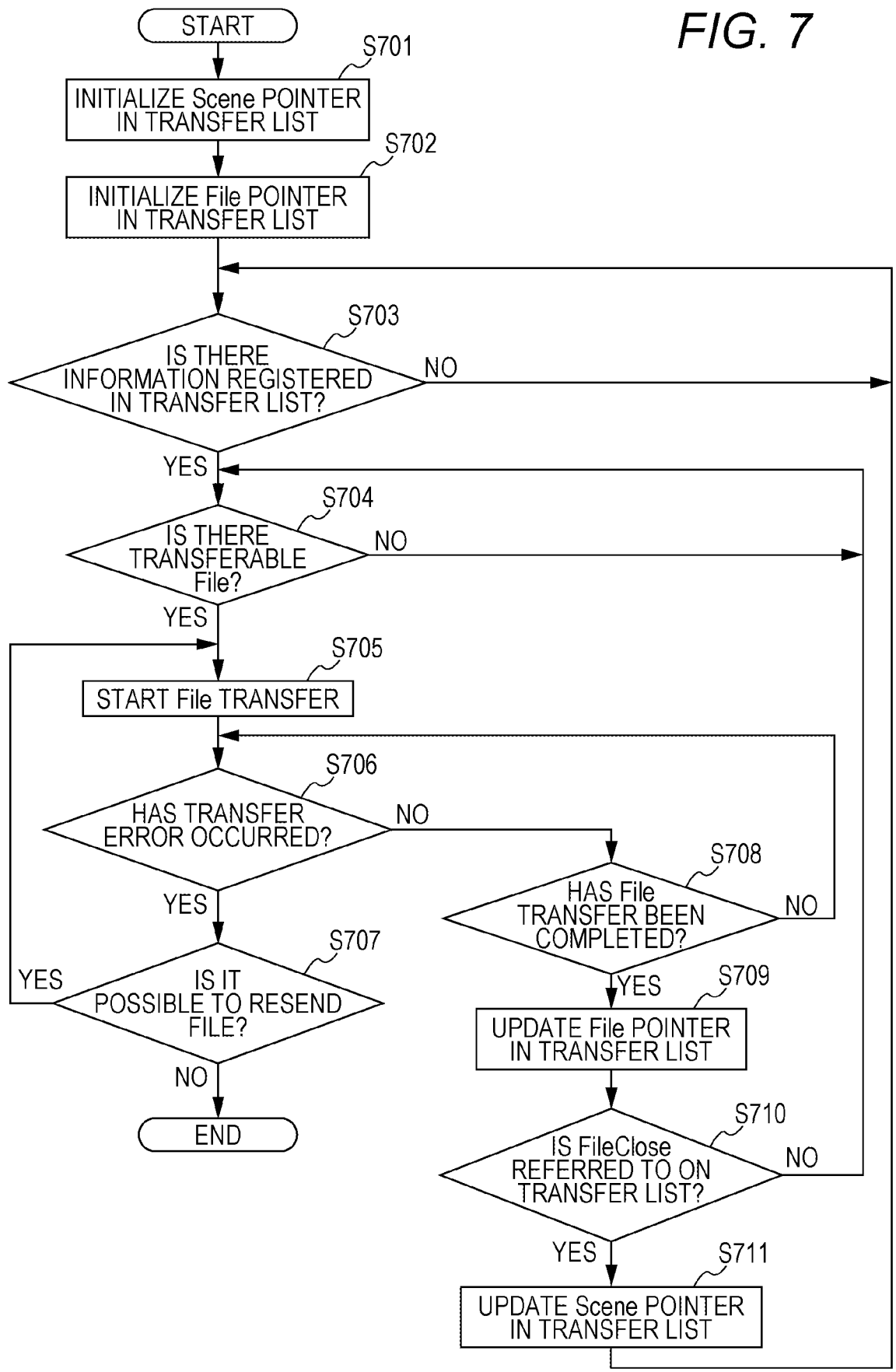
FIG. 7 is a flowchart illustrating an operation of transfer processing.

FIG. 7 is a flowchart illustrating an example of a transfer processing operation according to the transfer list.

In S701, the CPU 113 initializes a scene pointer indicating a scene to be registered in the transfer list.

In S702, the CPU 113 initializes a file pointer indicating a file to be registered in the transfer list.

In S703, the CPU 113 determines the presence or absence of file information registered in the transfer list. If the registered file information is present in the transfer list, the processing proceeds to S704. If there is no registered file information, the processing returns to S703 to determine again whether there is file information.

In S704, the CPU 113 determines whether there is a file that can be transferred to the external device from the registered file information in the transfer list. If there is a file that can be transferred, the processing proceeds to S705. If there is no file that can be transferred, the processing returns to S704 to determine again whether where is a file that can be transferred.

In S705, the CPU 113 starts the transfer of files that are registered in the transfer list and can be transferred to the external device.

In S706, the CPU 113 determines whether a transfer error has occurred. If a transfer error has occurred, the processing proceeds to S707. If no transfer error has occurred, the processing proceeds to S708.

In S707, the CPU 113 determines whether the file failed to transfer can be transferred again. If the file can be transferred, the processing returns to S705 to restart transfer of the file to the external device.

In S708, the CPU 113 determines whether the transfer of the file has completed. If the transfer is complete, the processing proceeds to S709. If the transfer has not been complete, the processing returns to S706 to determine whether a transfer error has occurred during the transfer.

In S709, the CPU 113 updates the file pointer in the transfer list because there is a file that has been transferred.

In S710, the CPU 113 determines whether all files related to the scene currently referred to on the transfer list and whether the file pointer on the transfer list is referring to FileClose. If the file pointer is referring to FileClose, the processing proceeds to S711. If the file pointer is not referring to FileClose, the processing returns to S704.

In S711, the CPU 113 updates the scene pointer on the transfer list, and the processing returns to S703.

The video camera 100 according to the present exemplary embodiment performs the basic operation as described above. Accordingly, the user instructs transfer of image data during image capturing or immediately after image capturing, thereby making it possible to maintain the immediacy to the transfer, without the need for, for example, checking the reproduction. Consequently, the user can easily transfer desired image data.

On the other hand, the timing of instructing the transfer of image data may be missed when recording is performed again immediately after recording is stopped. The case where the timing of instructing transfer of image data is missed will now be described with reference to FIG. 3.

Referring to FIG. 3, there is a case where the user intends to instruct transfer of Scene 306 during the period of RecPause 302, and thus the user does not instruct the transfer during the period of Rec 304. Further, during the period of RecPause 302, the user may start recording in a hurry at an appropriate timing to capture an image. For example, when the video camera is used for a civilian purpose, the user wishes to record an image so as not to miss an important experience with his/her family or friends. When the video camera is used for a business purpose, the user wishes to capture an image without missing an appropriate timing for image capturing at a coverage site or the like, and to provide captured contents as news material. In such cases, it is assumed that the period of RecPause 302 is short, which makes it impossible for the user to instruct the transfer. It is also assumed that the user is preoccupied with starting of recording and forgets to instruct the transfer.

If the transfer instruction is missed during the period of RecPause 302, there is a need for, for example, causing the video camera described above to transit to a preview reproduction mode when the transfer of Scene 306 is instructed. In this case, the user cannot easily transfer desired image data, and cannot maintain the immediacy to transfer image data.

The operation of the video camera 100 for solving the above-described problems will be described below with reference to FIGS. 8 to 11.

Figure 8B:
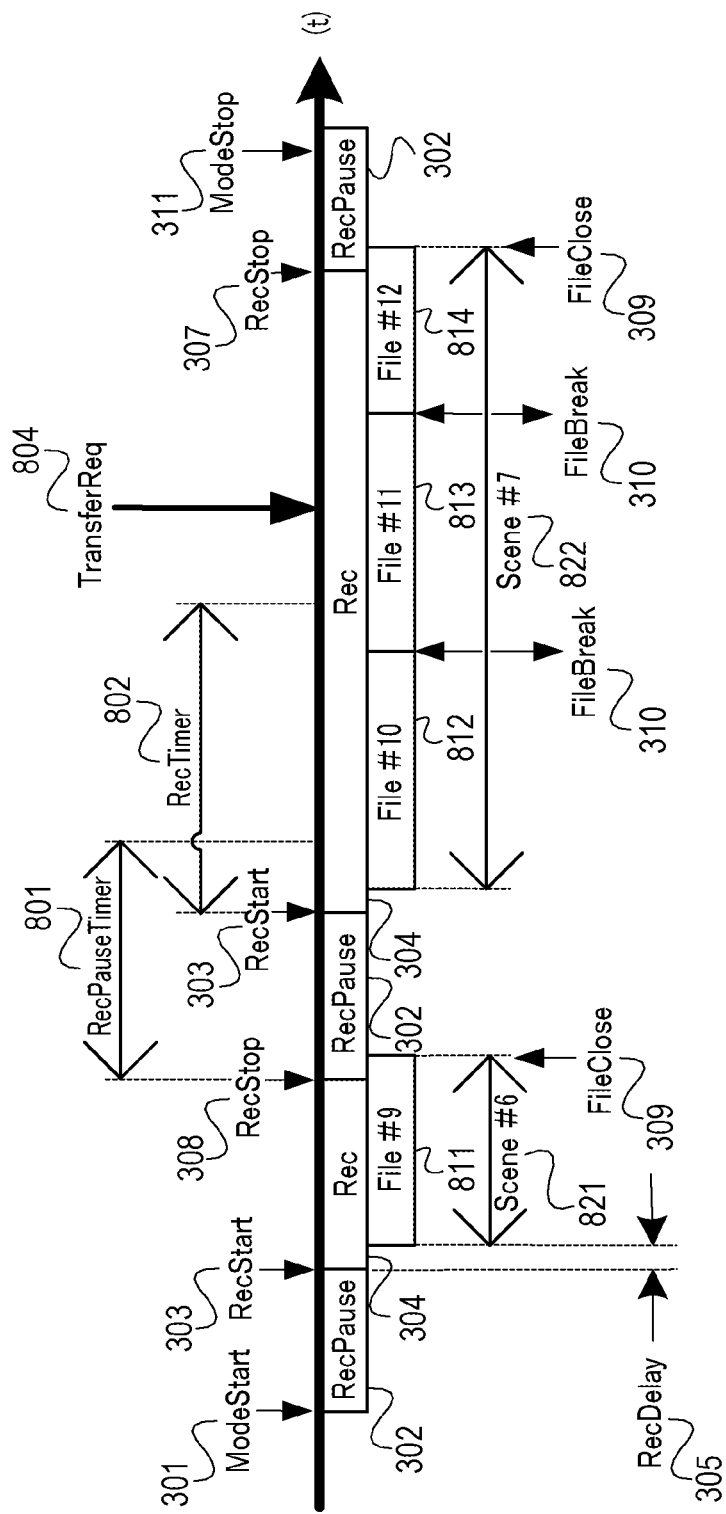
Figure 8C:
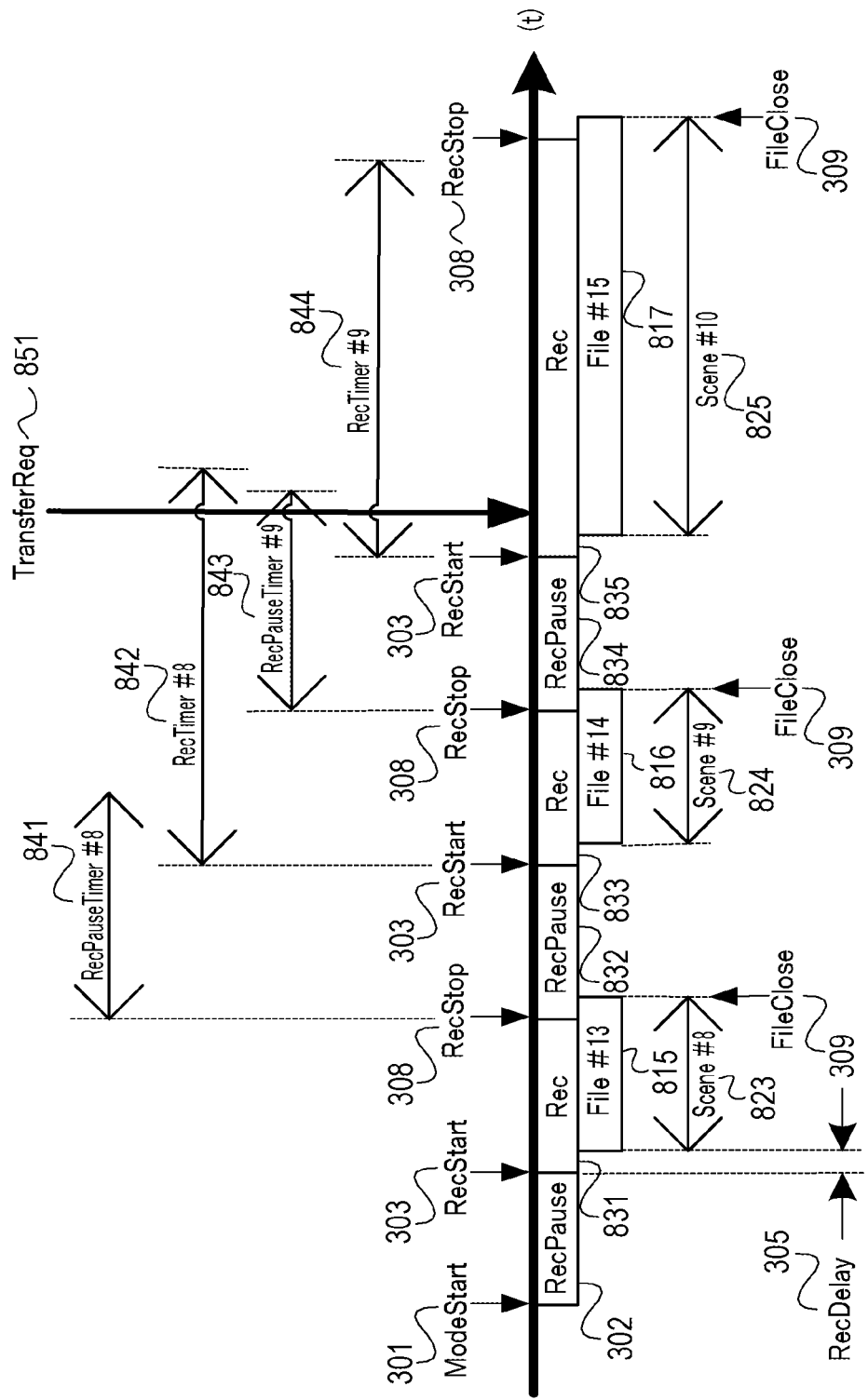

FIGS. 8A to 8C are diagrams each illustrating an example of a relationship between a transfer instruction in each recording operation state of the video camera 100 and a scene and file generation timing.

FIG. 8A is a conceptual diagram illustrating an example of a case where the operation unit 106 instructs the video camera 100 in the recording state to transfer a scene being recorded to the external device. Differences between FIG. 8A and FIG. 3 will now be mainly described.

RecPauseTimer 801 is a timer for measuring time starting from RecStop 308. An initial value is set to RecPauseTimer 801 at the time of RecStop 308, and RecPauseTimer 801 measures the elapsed time of RecPause 302 by down counting. The elapsed time corresponds to an example of a first elapsed time. As the initial value, for example, five seconds are set to RecPauseTimer 801. The time of the initial value corresponds to an example of a first predetermined period of time.

FIG. 8A illustrates that the period of RecPause 302 does not exceed five seconds. For example, the period of RecPause 302 is 3.5 seconds, while RecPauseTimer 801 can measure five seconds at maximum. At the end of the period of RecPause 302, RecPauseTimer 801 stops down counting at the value of, for example, 1.5 seconds, so that down counting of RecPauseTimer 801 is stopped.

RecTimer 802 is a timer for measuring time from RecStart 303. An initial value is set at the time of RecStart 303, and RecTimer 802 performs down counting to measure an elapsed of the Rec 304. This elapsed time corresponds to an example of a second elapsed time. As the initial value, for example, seven seconds are set to RecTimer 802. The time of the initial value corresponds to an example of a second predetermined period of time.

FIG. 8A illustrates that the period of Rec 304 exceeds seven seconds. For example, the period of Rec 304 is 20 seconds, while RecTimer 802 can measure seven seconds at maximum. At the end of the period of Rec 304, RecTimer 802 indicates the value of zero seconds as a result of down counting.

TransferReq 803 indicates an input operation for the operation unit 106 to instruct the video camera 100 in the recording state to transfer a scene being recorded to the external device. FIG. 8A illustrates that RecTimer 802 performs down counting from the initial value of seven seconds and TransferReq 803 has occurred at the time when RecTimer 802 indicates two seconds.

Scene #6 (821) and Scene #7 (822) each indicate a set of recording from the recording start operation performed by the user to the recording end operation performed by the user. File #9 (811) is a file to be generated as a result of recording Scene #6 (821). File #10 (812), File #11 (813), and File #12 (814) are files to be generated as a result of recording Scene #7 (822).

FIG. 8B is a conceptual diagram illustrating an example of a case where the operation unit 106 instructs the video camera 100 in the recording state to transfer a scene being recorded to the external device. Differences between FIG. 8B and FIG. 3 will now be mainly described.

TransferReq 804 indicates an input operation for the operation unit 106 to instruct the video camera 100 in the recording state to transfer a scene being recorded to the external device. FIG. 8B illustrates that RecTimer 802 performs down counting from the initial value of seven seconds and TransferReq 804 has occurred in, for example, two seconds, after RecTimer 802 indicates the value of zero seconds.

FIGS. 9A to 9E are conceptual diagrams each illustrating an example of transfer lists and constituent elements thereof in the video camera 100. Differences between FIGS. 9A to 9E and FIGS. 5A to 5H will now be mainly described.

The transfer list illustrated in FIG. 9A illustrates a case where in TransferReq 803 illustrated in FIG. 8A, the video camera 100 in the recording operation is instructed to transfer a scene being recorded to the external device.

Scene information about Scene #6 (821) is registered in a scene number [0] of a list 9010. File information about File #9 (811) constituting Scene #6 is registered in a file number [0] [0] of a list 9011. The file constituting Scene #6 is only File #9 (811), and thus FileClose is registered in a file number [0] [1] of a list 9012.

Scene information about Scene #7 (822) is registered in a scene number [1] of a list 9020. At the time when ransferReq 803 has occurred, File #10 (812) constituting Scene #7 (822) is being recorded and in a FileOpen state, and thus cannot be transferred. Accordingly, a file number [1] [0] of a list 9021 is in an unregistered state.

Further, a scene number [2] of a list 9030 is in an unregistered state.

Accordingly, the transfer list illustrated in FIG. 9A indicates that two scenes, i.e., Scene #6 (821) and Scene #7 (822), are registered by TransferReq 803.

The transfer list illustrated in FIG. 9B indicates a case where in TransferReq 804 illustrated in FIG. 8B, the video camera 100 in the recording operation is instructed to transfer a scene being recorded to the external device.

Scene information about Scene #7 (822) is registered in a scene number [0] of a list 9100. File information about File #10 (812) constituting Scene #7 is registered in a file number [0] [0] of a list 9101. At the time when TransferReq 804 has occurred, File #11 (813) constituting Scene #7 (822) is being recorded and in a FileOpen state, and thus cannot be transferred. Accordingly, a file number [0] [1] of a list 9102 is in an unregistered state.

Further, a scene number [1] of a list 9110 is in an unregistered state.

Accordingly, the transfer list illustrated in FIG. 9B indicates that only scene, i.e., Scene #7 (822), is registered by TransferReq 804.

Figure 10B:
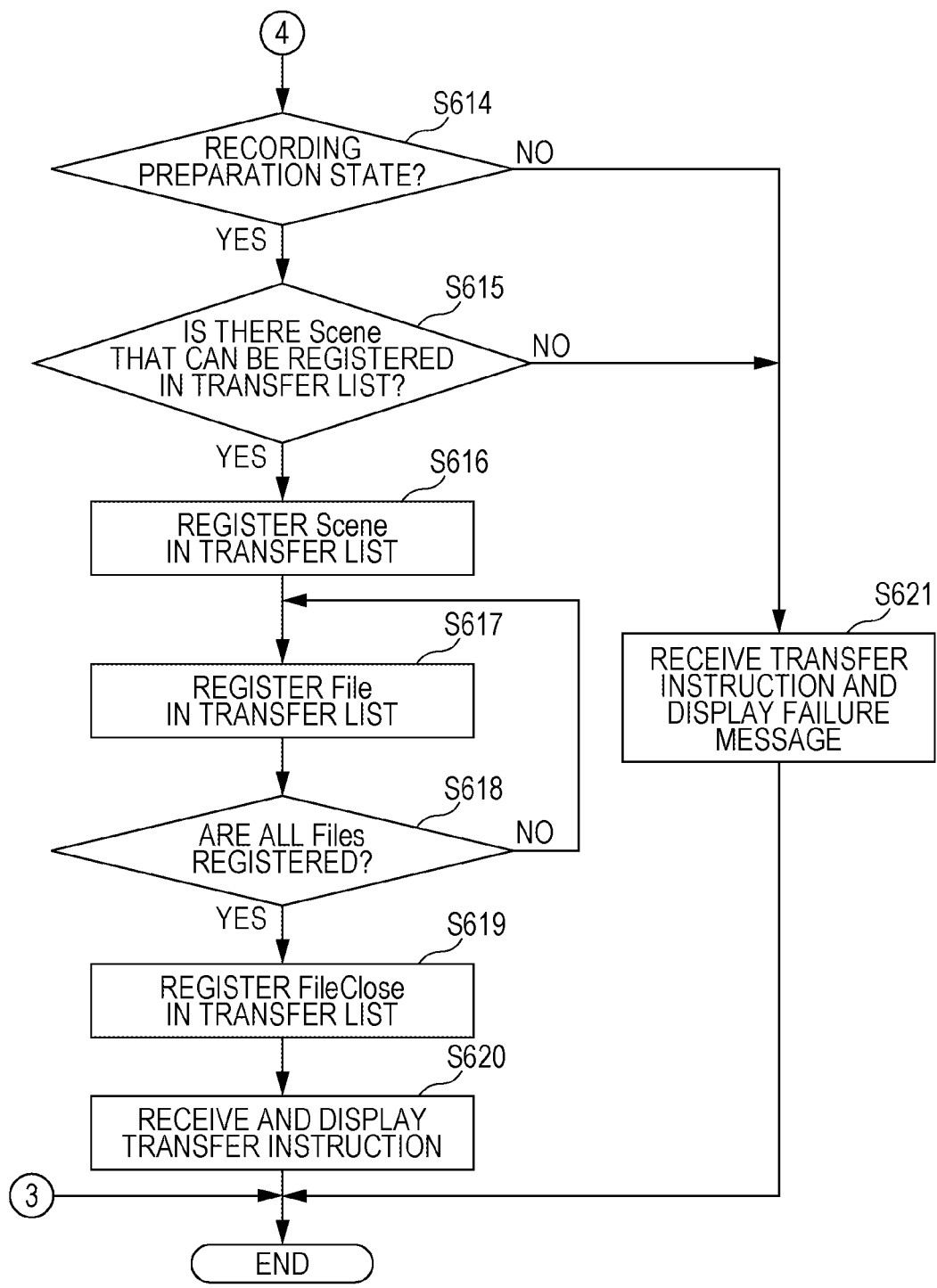

FIGS. 10A and 10B are flowcharts illustrating an example of the operation of transfer list registration processing performed by the video camera 100. Differences between the flowcharts of FIGS. 10A and 10B and the flowcharts of FIGS. 6A and 6B will now be mainly described. Processing similar to that in the flowcharts of FIGS. 6A and 6B is denoted by the same step number.

If the current state is the recording state in S603, the processing proceeds to S1001. S1001 is a subroutine for executing processing of registering the previously recorded scene in the transfer list. Even when it is determined in S603 that the current state is the recording state, the execution of S1001 enables registration of the previously recorded scene in the transfer list. Accordingly, even in the case of performing recording again immediately after recording is stopped, the user can transfer image data without the need for checking the reproduction after recording is stopped, so that a rapid operability can be achieved.

Figure 11:
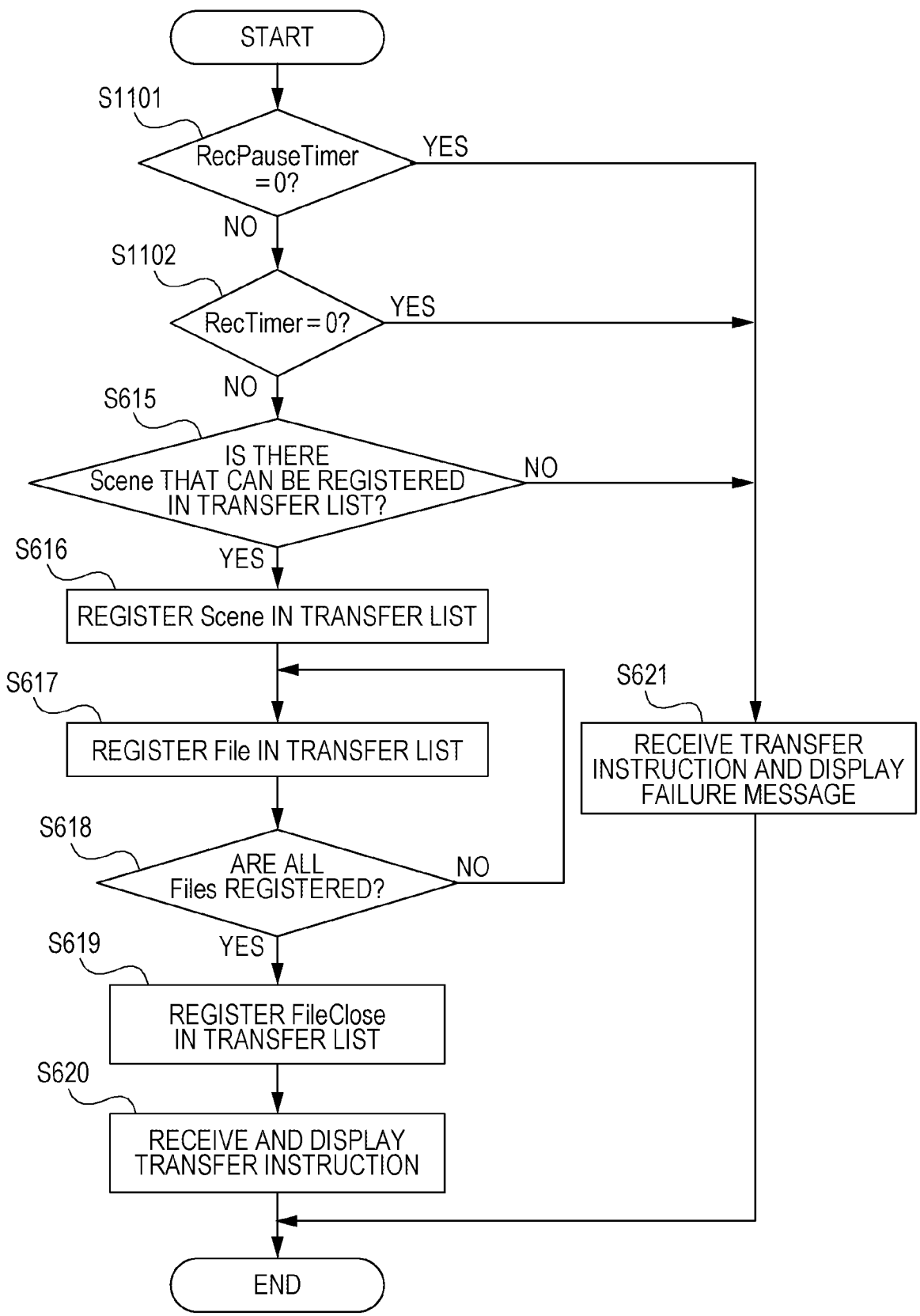
FIG. 11 is a flowchart illustrating an operation of transfer list registration processing.

FIG. 11 is a subroutine illustrating an example of processing of S1001 in the flowchart of the transfer list registration processing operation illustrated in FIGS. 10A and 10B. The flowchart of FIG. 11 includes processing similar to the processing performed when it is determined in S614 illustrated in FIG. 6B that the current state is the recording preparation state. Processing similar to that in the flowcharts of FIGS. 6A and 6B is denoted by the same step number, and differences between the flowchart of FIG. 11 and the flowcharts of FIGS. 6A and 6B are mainly described.

In S1101, the CPU 113 determines whether RecPauseTimer 801 illustrated in FIG. 8A indicates "0". In FIG. 8A, the period of RecPause 302 is short. Accordingly, RecPauseTimer 801 stops down counting not at the value of "0", but at the value of, for example, 1.5 seconds. If RecPauseTimer 801 does not indicate "0" the processing proceeds to S1102. If RecPauseTimer 801 indicates "0", the processing proceeds to S621. This case indicates that the previously recorded scene can be registered only when the period of RecPause 302 does not exceed the initial value (e.g., five seconds) of RecPauseTimer 801.

When the period of RecPause 302 is long, the user can instruct the transfer within the period of RecPause 302. Accordingly, if RecPauseTimer 801 started from RecStop does not indicate "0", it is assumed that the user cannot instruct the transfer although the user has an intention to instruct the transfer.

In S1102, the CPU 113 determines whether RecTimer 802 illustrated in FIG. 8A indicates "0". If RecTimer 802 does not indicate "0", the processing proceeds to S615. If RecTimer 802 indicates "0", the processing proceeds to S621. This case indicates that the previously recorded scene can be registered only when the period of Rec 304 does not exceed the initial value (e.g., seven seconds) of RecTimer 802. Even if the transfer cannot be instructed during the period of RecPause 302, the user is allowed to register the previously recorded scene only during a certain period after recording is started.

If RecTimer 802 indicates "0", it is assumed that the user has no intension to register the previously recorded scene even when RecPauseTimer 801 does not indicate "0".

The processing of S1101 and S1102 is processing for enabling the user to instruct the transfer of the previously recorded scene even if the period of RecPause 302 is short, or the user is preoccupied with starting of recording and cannot instruct the transfer within the period of RecPause 302.

The processing of S615 to S621 is similar to that in the flowcharts of FIGS. 6A and 6B, and thus the description thereof is omitted.

Figure 12:
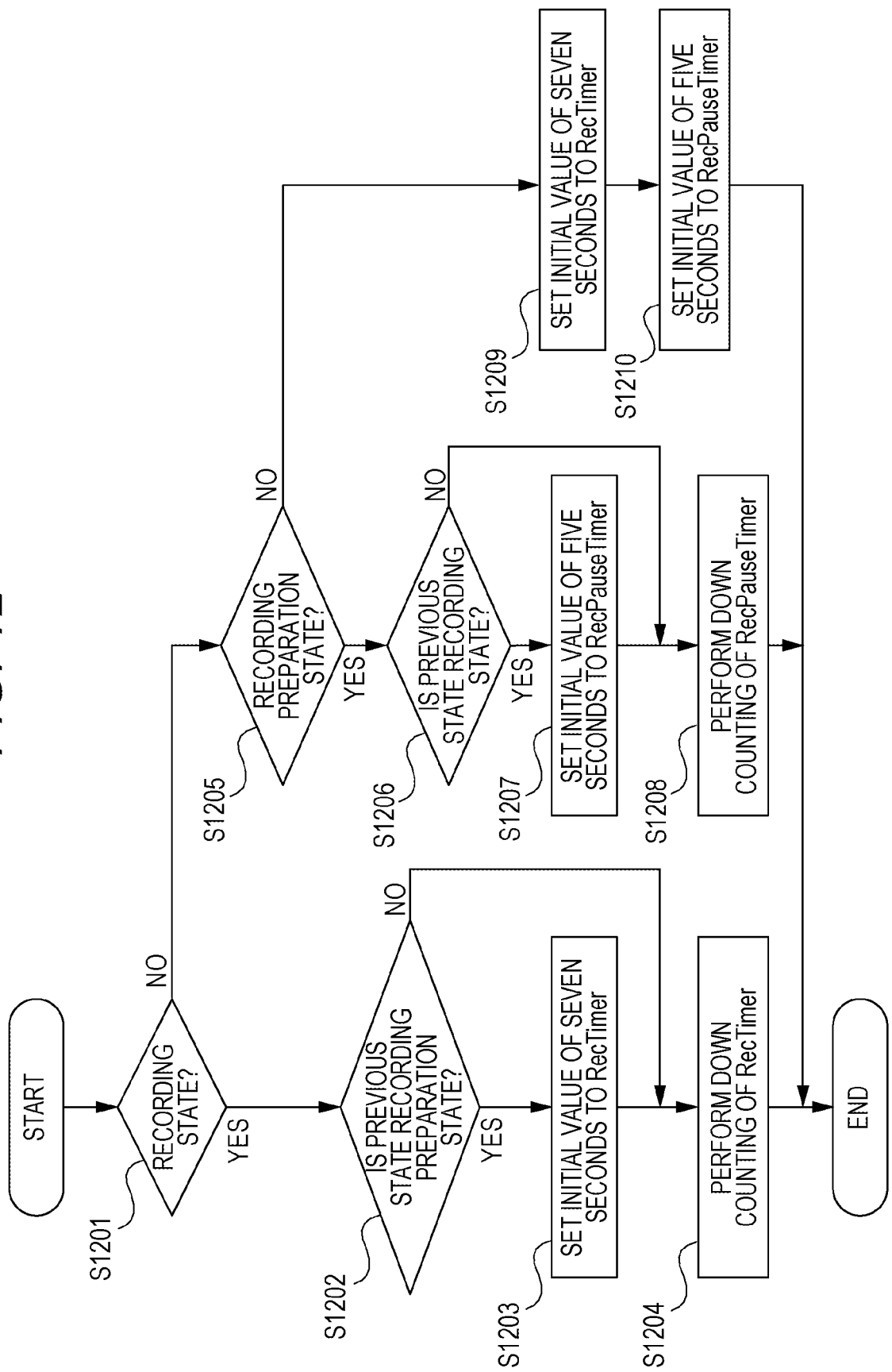
FIG. 12 is a flowchart illustrating an operation for setting timer values.

FIG. 12 is a flowchart illustrating an example of an operation for setting the value of the timer in the transfer list registration processing. The flowchart of FIG. 12 is executed periodically, for example, at intervals of one second, in parallel to the transfer list registration processing, and after that the flowchart of FIG. 12 is executed when recording is started and when recording is stopped.

In S1201, the CPU 113 determines whether the video camera is in the recording state (Rec state). If the video camera is in the recording state, the processing proceeds to S1202. If the video camera is not in the recording state, the processing proceeds to S1205.

In S1202, the CPU 113 determines whether the previous state is the recording preparation state (RecPause state). If the previous state is the recording preparation state, the processing proceeds to S1203.

In S1203, the CPU 113 sets the initial value (e.g., seven seconds) to the RecTimer 802. In S1202, if the previous state is not the recording preparation state, the processing proceeds to S1204 without performing the processing of S1203. Accordingly, only when the CPU 113 transits from the recording preparation state to the recording state, the CPU 113 sets the initial value to RecTimer 802.

In S1204, the CPU 113 causes the RecTimer to perform down counting. For example, the RecTimer performs down counting like seven seconds, six seconds, five seconds, four seconds, three seconds, two seconds, one second, and zero seconds, per second.

In S1205, the CPU 113 determines whether the video camera is in the recording preparation state (RecPause state). If the video camera is in the recording preparation state, the processing proceeds to S1206. If the video camera is not in the recording preparation state, the processing proceeds to S1209.

In S1206, the CPU 113 determines whether the previous state is the recording state (Rec state). If the previous state is the recording state, the processing proceeds to S1207.

In S1207, the CPU 113 sets the initial value (e.g., five seconds) to RecPauseTimer 801. In S1206, if the previous state is not the recording state, the processing proceeds to S1208 without performing the processing of S1207. Accordingly, only when the CPU 113 transits from the recording state to the recording preparation state, the CPU 113 sets the initial value to RecPauseTimer 801.

In S1208, the CPU 113 causes RecPauseTimer 801 to perform down counting. For example, RecPauseTimer 801 performs down counting like five seconds, four seconds, three seconds, two seconds, one second, and zero seconds, per second.

In S1209, the CPU 113 sets the initial value (e.g., seven seconds) to RecTimer.

In S1210, the CPU 113 sets initial value (e.g., five seconds) to RecPauseTimer. After that, the processing is terminated.

Figure 13:
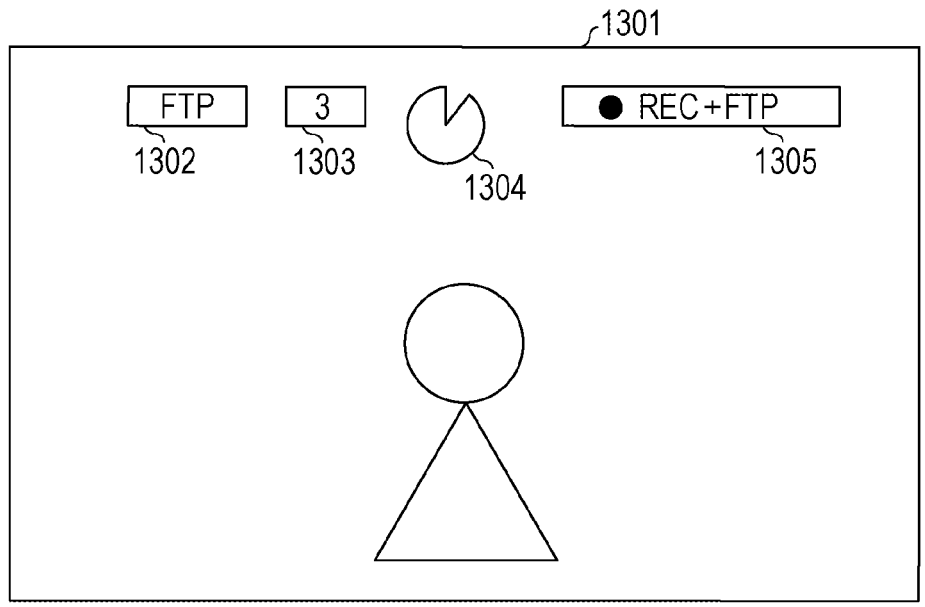
FIG. 13 is a diagram illustrating a user interface (UI) displayed on a display unit.

FIG. 13 is a diagram illustrating an example of the UI displayed on the display unit 112. The UI illustrated in FIG. 13 corresponds to the case of instructing the transfer in the recording state as illustrated in FIGS. 8A and 8B.

In this case, an area 1301 indicates a display area of a liquid crystal display (LCD) panel as the display unit 112. An icon 1302 indicates a display item for indicating that the video camera 100 is in an FTP communication state. A registered-scene-number icon 1303 indicates a display item for displaying the number of scenes registered in the transfer list. A remaining time icon 1304 indicates a display item for displaying a remaining time for the initial value of RecTimer 802. This case illustrates an example where the remaining time icon 1304 is illustrated as a pie chart. The remaining time icon 1304 is displayed in the vicinity of the registered-scene-number icon 1303, thereby enabling the user to easily recognize the remaining time during registration in the transfer list.

A state display icon 1305 indicates a display item for displaying the recording state. The state display icon 1305 includes a red circular icon, a character "REC", and a character "+FTP". The user can recognize the recording state by visually observing "REC" in the state display icon 1305. Further, the user can recognize that the scene that is currently being recorded is to be transferred to the external device by visually observing "+FTP" in the state display icon 1305.

In the present exemplary embodiment, the currently recorded scene and the previously recorded scene can be registered in the transfer list and these scenes can be transferred to the external device. Thus, since a plurality of scenes can be registered in the transfer list, the user can easily recognize which one of the scenes to be transferred among the plurality of scenes is to be transferred, by displaying the state display icon 1305 when the currently recorded scene is registered in the transfer list.

Figure 14A:
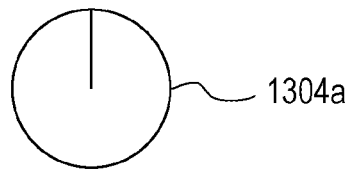
FIGS. 14A to 14C are diagrams each illustrating a remaining time icon.
Figure 14B:
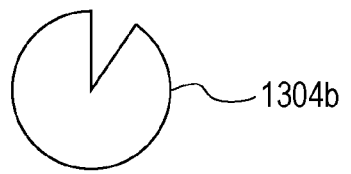
Figure 14C:

FIGS. 14A to 14C are diagrams each illustrating an example of the remaining time icon 1304.

The remaining time icon 1304 indicates the state of RecTimer 802. A case where the initial value of RecTimer 802 is seven seconds will now be described.

A remaining time icon 1304a illustrated in FIG. 14A indicates that the remaining time of RecTimer 802 is seven seconds. In this case, the initial value is seven seconds and the remaining time is seven seconds, which indicates that 100% of the timer time is available. Accordingly, this state is displayed as a 360-degree pie chart.

A remaining time icon 1304b illustrated in FIG. 14B indicates that the remaining time of RecTimer 802 is six seconds. In this case the initial value is seven seconds and the remaining time is six seconds, which indicates that 86% of the timer time is available. Accordingly, this state is displayed as a 309-degree pie chart.

A remaining time icon 1304c illustrated in FIG. 14C indicates that the remaining time of the RecTimer 802 is one second. In this case, the initial value is seven seconds and the remaining time is one second, which indicates that 14% of the timer time is available. Accordingly, this state is displayed as a 51-degree pie chart.

In this manner, the shape of the display icon varies with the elapsed time, and the display icon is displayed so that the user can recognize the progression rate of the elapsed time with respect to the initial value.

When the remaining time of RecTimer 802 is zero seconds, the remaining time icon 1304 is hidden.

Thus, the display is performed to enable recognition of the progression rate of the time during which the previously recorded scene can be set as the transfer target, thereby enabling the user to easily recognize whether the previously recorded scene can be transferred. Further, the display item having a shape that varies according to the time during which the previously recorded scene can be set as the transfer target is displayed, thereby enabling the user to visually recognize whether the previously recorded scene can be transferred.

In the present exemplary embodiment, when the transfer of image data is instructed during recording of image data, it is determined whether the first elapsed time from the time when recording of the previously recorded image data is stopped to the time when recording of the current image data is started has reached the first predetermined period of time (S1101 in FIG. 11). Further, it is determined whether the second elapsed time from the time when recording of the current image data is started has reached the second predetermined period of time (S1102 in FIG. 11). If the first elapsed time has not reached the first predetermined period of time and the second elapsed time has not reached the second predetermined period of time, the previously recorded image data and the image data being recorded are set as the transfer target. As the state where the first elapsed time has not reached the first predetermined period of time, it is assumed that, for example, the first elapsed time is short and the user cannot instruct the transfer. Accordingly, even if recording of the current image data is started, when the transfer of image data is instructed within the second predetermined period of time, the previously recorded image data is set as the transfer target.

The processing described above enables the user to easily set desired image data as the transfer target. In addition, there is no need for the user to instruct the transfer of image data by, for example, checking the reproduction, and thus the immediacy to the transfer can be maintained and rapid operability can be achieved. In particular, immediately after image data is recorded, the user remembers the contents of the recorded image data. Accordingly, the user can determine whether to set the image data as the transfer target, without the need for, for example, checking the reproduction, and thus the user can rapidly set the image data as the transfer target.

The present exemplary embodiment illustrates a case where if the first elapsed time has not reached the first predetermined period of time and the second elapsed time has not reached the second predetermined period of time, the previously recorded image data and the image data being recorded are set as the transfer target. However, the present invention is not limited to this case. Only the previously recorded image data may be set as the transfer target, and the image data being recorded may not be set as the transfer target.

The present exemplary embodiment also illustrates a case where it is determined whether the previously recorded scene can be registered by using two timers, i.e., RecPause-Timer 801 and RecTimer 802. However, one timer obtained by integrating the two timers may be used. For example, the CPU 113 sets the initial value to the timer when the CPU 113 transits from the recording state to the recording preparation state, and starts down counting. The time set as the initial value of the timer corresponds to an example of a predetermined period of time. The CPU 113 continues down counting even after the CPU 113 transits to the recording state again. If the value of the timer does not indicate "0" when the transfer of image data is instructed during recording of image data, the CPU 113 sets the previously recorded image data and the image data being recorded as the transfer target. Only the previously recorded image data may be set as the transfer target, and the image data being recorded may not be set as the transfer target. On the other hand, if the value of the timer indicates "0" when the transfer of image data is instructed during recording of image data, the CPU 113 sets only the image data being recorded as transfer target. Further, in the case of using one timer, assume a case where the transfer of image data is instructed during recording of image data and the previously recorded image data is set as the transfer target, and after that the transfer of image data is instructed again during recording of the same image data. In this case, the CPU 113 also sets the image data being recorded as the transfer target, regardless of whether the value of the timer indicates "0" when the transfer of image data is instructed again. Therefore, the user can easily set desired image data as the transfer target.

Second Exemplary Embodiment

Next, a second exemplary embodiment will be described. Differences between the second exemplary embodiment and the first exemplary embodiment will now be mainly described.

The transfer list illustrated in FIG. 9C indicates a case where in TransferReq 803 illustrated in FIG. 8A, the video camera 100 in the recording state is instructed to transfer a scene being recorded to the external device.

Scene information about Scene #6 (821) is registered in a scene number [0] of a list 9200. File information about File #9 (811) constituting Scene #6 is registered in a file number [0] [0] of a list 9201. The file constituting Scene #6 is only File #9 (811), and thus FileClose is registered in a file number [0] [1] of a list 9202.

Further, a scene number [1] of a list 9210 is in an unregistered state.

Accordingly, the transfer list illustrated in FIG. 9C indicates that only one scene, i.e., Scene #6 (821), is registered by TransferReq 803.

The transfer list illustrated in FIG. 9D indicates a case where in TransferReq 804 illustrated in FIG. 8B, the video camera 100 in the recording operation is instructed to transfer a scene being recorded to the external device.

Scene information about Scene #6 (821) is registered in a scene number [0] of a list 9300. File information about File #9 (811) constituting Scene #6 is registered in a file number [0] [0] of a list 9301. The file constituting Scene #6 (821) is only File #9, and thus FileClose is registered in a file number [0] [1] of a list 9302.

Scene information about Scene #7 (822) is registered in a scene number [1] of a list 9310. File information about File #10 (812) constituting Scene #7 is registered in a file number [1] [0] of a list 9311. At the time when TransferReq 804 has occurred, File #11 (813) constituting Scene #7 (822) is being recorded and in a FileOpen state, and thus cannot be transferred. Accordingly, a file number [1] [1] of a list 9312 is in an unregistered state.

The transfer list illustrated in FIG. 9D indicates that Scene #7 (822) is additionally registered by TransferReq 804 in the transfer list in which Scene #6 (821) is already registered.

Figure 15B:
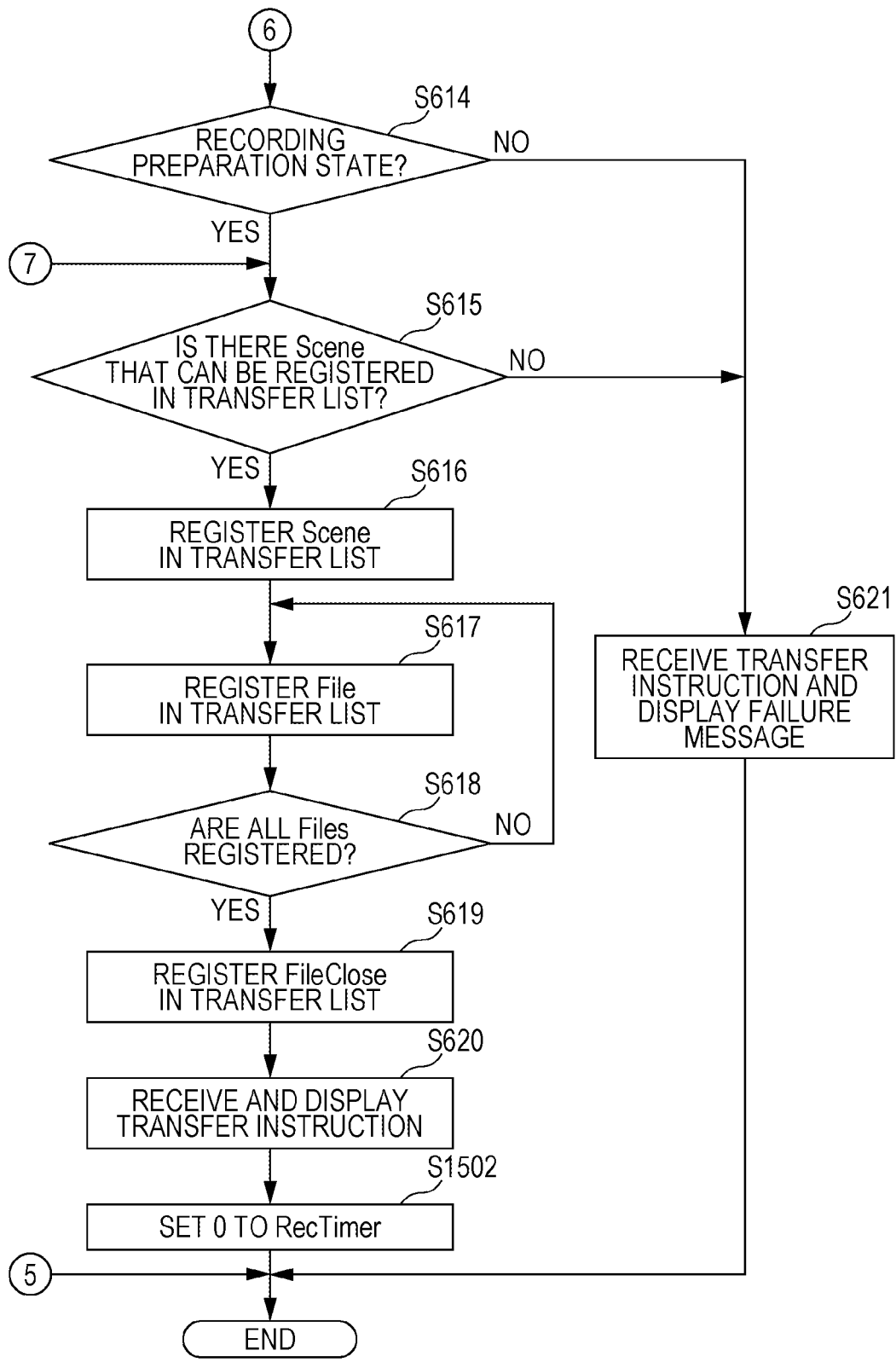

FIGS. 15A and 15B are flowcharts illustrating the operation of transfer list registration processing performed by the video camera 100. Differences between the flowcharts of FIGS. 15A and 15B and the flowcharts of FIGS. 6A and 6B will now be mainly described. Processing similar to that in the flowcharts of FIGS. 6A and 6B is denoted by the same step number.

In S603, if the current state is the recording state, the processing proceeds to S1501. In S1501, the CPU 113 determines whether one of the condition that RecTimer indicates and the condition that RecPauseTimer indicates "0" is satisfied. If one of the conditions is satisfied, the processing proceeds to S604. On the other hand, if RecTimer does not indicate "0" and RecPauseTimer also does not indicate "0", the processing proceeds to S615.

In S620, the user is notified that all files are registered in the transfer list through the display unit 112, and then the processing proceeds to S1502. In S1502, the CPU 113 sets "0" to the RecTimer. By the processing of S1502, RecTimer does not perform down counting to "0" after the CPU 113 registers the previously recorded scene in the transfer list. Accordingly, if the transfer is instructed again in the scene being recorded, it is determined in S1501 that RecTimer indicates "0" and the processing proceeds to S604. Accordingly, the CPU 113 registers the scene currently being recorded in the transfer list. Accordingly, the user can rapidly register the currently recorded scene in the transfer list without waiting for the time when RecTimer indicates "0".

In the present exemplary embodiment, when the transfer of image data is instructed during recording of image data, it is determined whether the first elapsed time from the time when recording of the previously recorded image data is stopped to the time when recording of the currently recorded image data is started has reached the first predetermined period of time (S1501 in FIG. 15A). Further, it is determined whether the second elapsed time from the time when recording of the current image data is started has reached the second predetermined period of time (S1501 in FIG. 15A). If the first elapsed time has not reached the first predetermined period of time and the second elapsed time has not reached the second predetermined period of time, only the previously recorded image data is set as the transfer target. Accordingly, like in the first exemplary embodiment, the user can easily set desired image data as the transfer target.

Third Exemplary Embodiment

Next, a third exemplary embodiment will be described. Differences between the third exemplary embodiment and the first and second exemplary embodiments will now be mainly described.

FIG. 8C is a conceptual diagram illustrating a case where the operation unit 106 instructs the video camera 100 in the recording state to transfer a scene being recorded to the external device. Differences between FIG. 8C and FIGS. 8A and 8B will now be mainly described.

Scene #8 (823), Scene #9 (824), and Scene #10 (825) indicate a set of recording from the recording start operation performed by the user to the recording end operation performed by the user. File #13 (815) is a file to be generated as a result of executing recording of Scene #8 (823) and executing recording processing indicated by Rec 831. File #14 (816) is a file to be generated as a result of executing recording of Scene #9 (824) and executing recording processing indicated by Rec 833. File #15 (817) is a file to be generated as a result of executing recording of Scene #10 (825) and executing recording processing indicated by Rec 835.

RecPause 832 indicates the recording preparation state between Rec 831 and Rec 833. RecPause 834 indicates the recording preparation state between Rec 833 and Rec 835.

RecPauseTimer #8 (841) is a timer that measures time starting from RecStop 308 of Scene #8 (823). RecTimer #8 (842) is a timer that measures time starting from RecStart 303 of Scene #9 (824). RecPauseTimer #9 (843) is a timer that measures time starting from RecStop 308 of Scene #9 (824). RecTimer #9 (844) is a timer that measures time starting from RecStart 303 of Scene #10 (825).

TransferReq 851 indicates an input operation for the operation unit 106 to instruct the video camera 100 in the recording state to transfer a scene being recorded to the external device. FIG. 8C illustrates that TransferReq 851 occurs when the remaining time of RecTimer #8 (842) is one second and the remaining time of RecTimer #9 (844) is six seconds.

The transfer list illustrated in FIG. 9E indicates a case where in TransferReq 851 illustrated in FIG. 8C, the video camera 100 in the recording state is instructed to transfer a scene being recorded to the external device.

Scene information about Scene #8 (823) is registered in a scene number [0] of a list 9400. File information about File #13 (815) constituting Scene #8 is registered in a file number [0] [0] of a list 9401. The file constituting Scene #8 is only File #13 (815), and thus FileClose is registered in a file number [0] [1] of a list 9402.

Scene information about Scene #9 (824) is registered in a scene number [1] of a list 9410. File information about File #14 (816) constituting Scene #9 is registered in a file number [1] [0] of a list 9411. The file constituting Scene #9 is only File #14 (816), and thus FileClose is registered in a file number [1] [1] of a list 9412.

Scene information about Scene #10 (825) is registered in a scene number [2] of a list 9420. At the time when TransferReq 851 has occurred, File #15 (817) constituting Scene #10 (825) is being recorded and in a FileOpen state, and thus cannot be transferred. Accordingly, a file number [2] [0] of a list 9421 is in an unregistered state.

FIG. 16 is a table illustrating an example of a transfer candidate list 1600.

Scene numbers are registered in a list 1601. A scene is registered in the transfer candidate list every time RecStop 308 occurs. Each value in brackets ([ ]) indicate a pointer P in the list. The initial value of the pointer P is "0". Every time a scene is registered in the transfer candidate list, the value of the pointer P is increased by "1", thereby registering a plurality of scenes in the transfer candidate list.

A list 1602 is a list of RecPauseTimer. A list 1603 is a list of RecTimer. RecPauseTimer and RecPauseTimer each include the pointer P and manage each of the scenes registered in the scene number list in association with the pointer P.

The transfer candidate list illustrated in FIG. 16 enables management of the elapsed time after recording is finished for each scene recorded a plurality of times, and management of image data to be registered in the transfer list.

Figure 17:
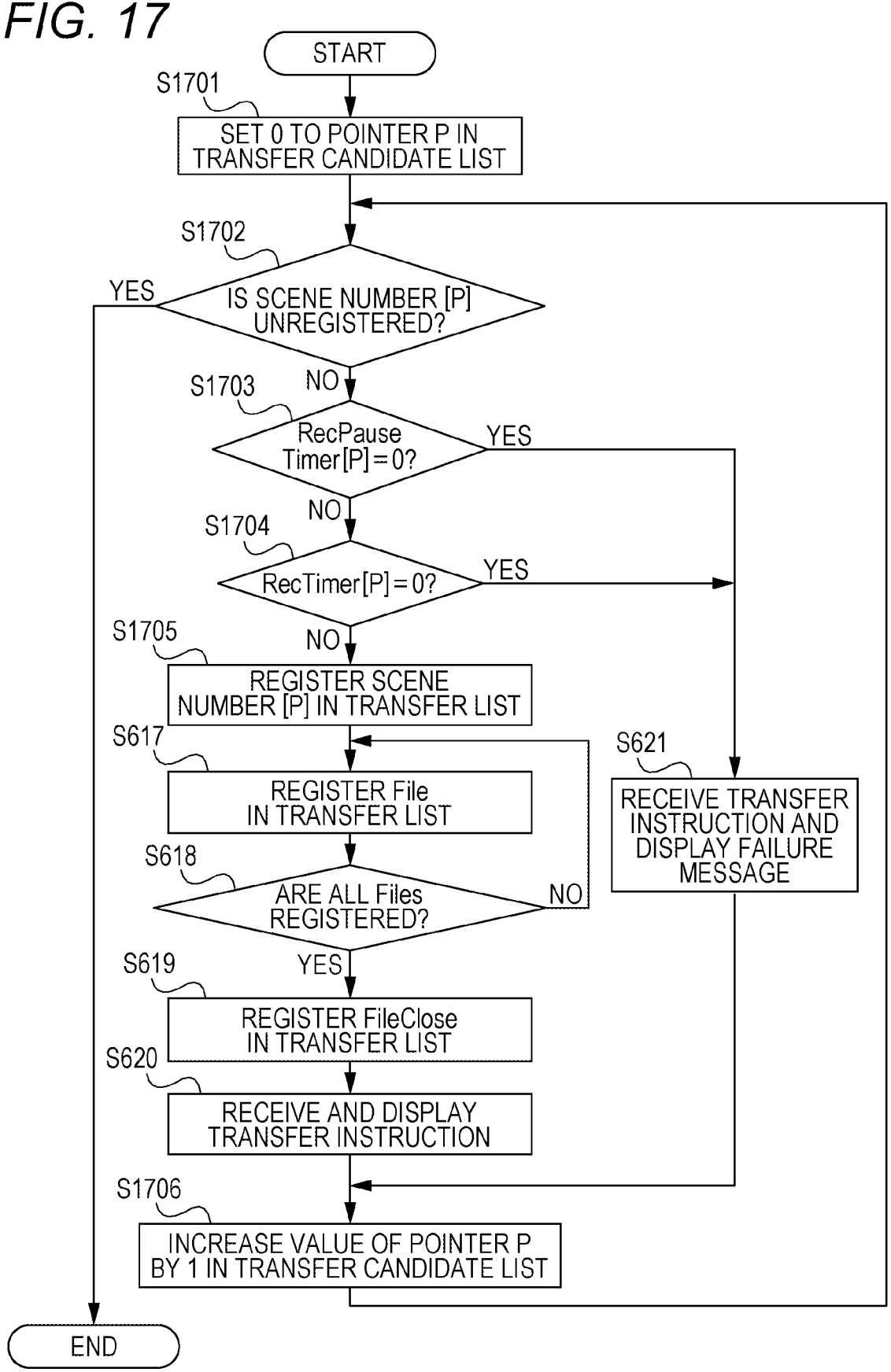
FIG. 17 is a flowchart illustrating an operation of transfer list registration processing.

FIG. 17 is a flowchart illustrating an example of the operation of transfer list registration processing performed by the video camera 100. Specifically, FIG. 17 is a subroutine indicating the processing of S1001 in the flowchart of transfer list registration processing illustrated in FIG. 10A and 10B. The flowchart of FIG. 17 includes processing similar to processing performed when it is determined that the current state is the recording preparation state in S614 illustrated in FIG. 6B. Processing similar to that in the flowcharts of FIGS. 6A and 6B is denoted by the same step number, and differences between the flowchart of FIG. 11 and the flowcharts of FIGS. 6A and 6B will now be mainly described.

In S1701, the CPU 113 sets the initial value "0" to search for the pointer P in the transfer candidate list.

In S1702, the CPU 113 determines the registration state of the scene number corresponding to the pointer P in the scene number row of the transfer candidate list. In an unregistered state, there is no recorded scene to be set as a transfer candidate. Accordingly, the processing is terminated.

In S1703, the CPU 113 determines whether the value of RecPauseTimer is "0". This processing is similar to the processing of S1101. At this time, the CPU 113 performs the determination using the value of RecPauseTimer corresponding to the pointer P.

In S1704, the CPU 113 determines whether the value of RecTimer is "0". This processing is similar to the processing of S1102. At this time, the CPU 113 performs the determination using the value of RecTimer corresponding to the pointer P.

In S1705, the CPU 113 registers the scene number in the transfer list. Specifically, the CPU 113 reads out the scene number corresponding to the pointer P from the transfer candidate list and registers the scene number in the transfer list.

In S1706, the CPU 113 increases the number of the pointer P in the transfer candidate list by "1", and the processing returns to S1702. Accordingly, even if a plurality of scenes is registered in the transfer candidate list, the plurality of scenes can be registered in the transfer list based on the values of RecPauseTimer and RecTimer corresponding to each scene.

Figure 18:
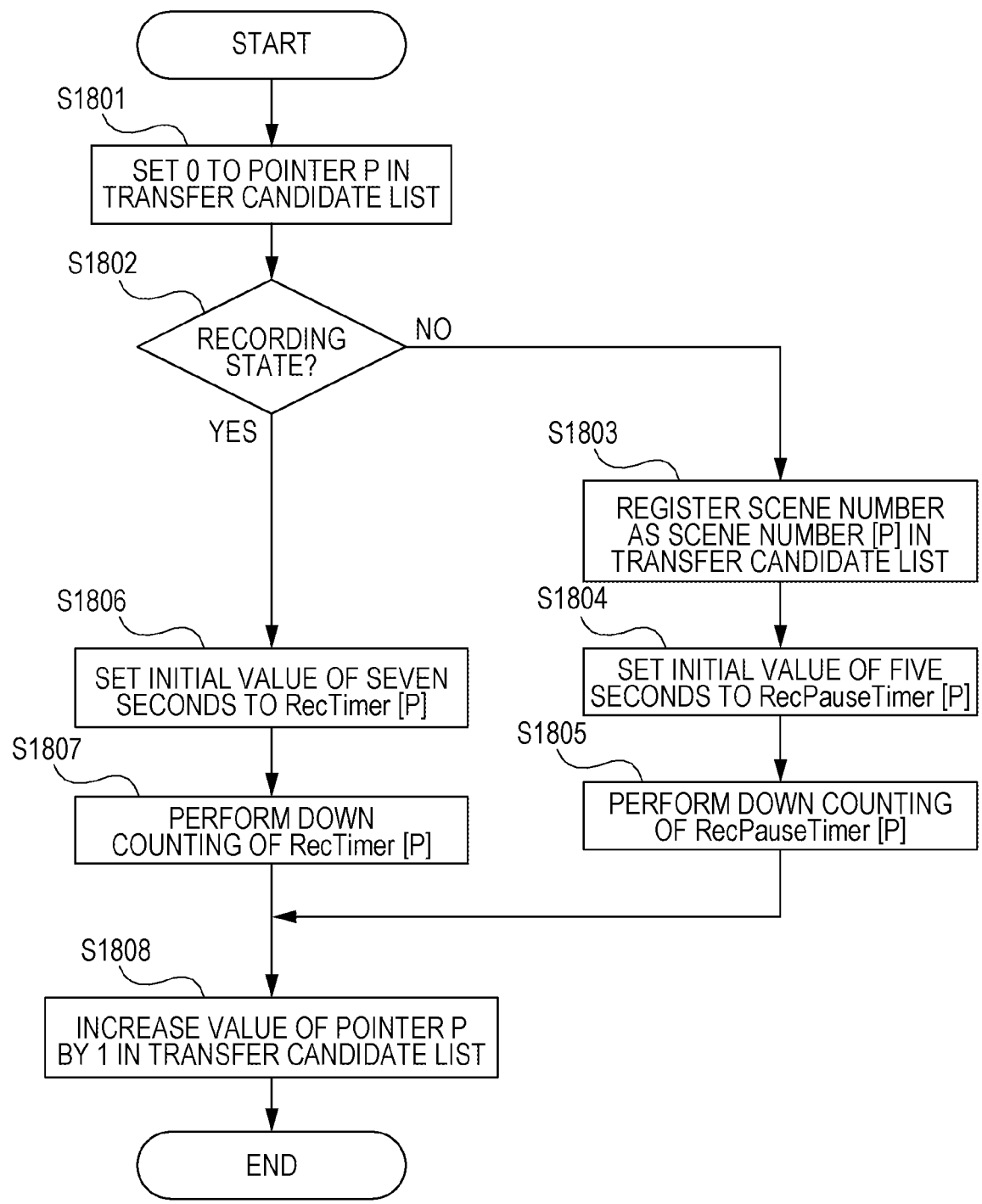
FIG. 18 is a flowchart illustrating an operation of registration processing in a transfer candidate list.

FIG. 18 is a flowchart illustrating an example of registration processing operation in the transfer candidate list by the video camera 100.

In S1801, the CPU 113 performs initialization processing for setting the pointer P in the transfer candidate list to "0".

In S1802, the CPU 113 determines whether the current state is the recording state. If the current state is the recording state, the processing proceeds to S1806. If the current state is not the recording state, the processing proceeds to S1803.

In S1803, the CPU 113 registers the recorded scene number as the scene number in the transfer candidate list. At this time, the CPU 113 registers the scene number at the position corresponding to the pointer P in the list.

In S1804, the CPU 113 sets the initial value (e.g., five seconds) to RecPauseTimer corresponding to the pointer P.

In S1805, the CPU 113 performs down counting of RecPauseTimer.

In S1806, the CPU 113 sets the initial value (e.g., seven seconds) to RecTimer corresponding to the pointer P.

In S1807, the CPU 113 performs down counting of RecTimer.

In S1808, the CPU 113 increases the value of the pointer P by "1" in the transfer candidate list.

In this manner, a list of recorded scenes is managed by the transfer candidate list using the pointer P. Further, in the transfer candidate list, each scene number and the timer corresponding to the scene are associated with the pointer P and thus collectively managed. Accordingly, even in a state where Rec and RecPause are repeatedly performed, the elapsed time after recording corresponding to each recorded scene can be managed, and the elapsed time can be utilized as a transfer list registration condition. In particular, for a coverage purpose, even when a complicated operation in which Rec and RecPause are repeatedly performed occurs, the scenes recorded in the transfer list can be rapidly registered, which leads to an increase in convenience.

The scene to be registered can be changed every time the transfer of the scene is instructed.

For example, the CPU 113 can register scenes in the transfer list in the order from the first recorded scene every time the transfer is instructed. Accordingly, when the transfer is first instructed, the CPU 113 registers the first recorded scene in the transfer list, and when the transfer is instructed next time, the CPU 113 registers the second recorded scene in the transfer list by replacing it with the first recorded scene. The CPU 113 may register the second recorded scene in the transfer list in addition to the first recorded scene when the transfer is instructed next time.

For example, the CPU 113 can register scenes in the order from the last recorded scene in the transfer list every time the transfer is instructed. Accordingly, when the transfer is instructed first, the CPU 113 registers the last recorded scene in the transfer list, and when the transfer is instructed next time, the CPU 113 registers the second recorded scene counted from the last recorded scene in the transfer list in place of the last recorded scene. When the transfer is instructed next time, the CPU 113 may register the second recorded scene counted from the last recorded scene in the transfer list in addition to the last recorded scene.

For example, when a button or the like is used as the operation unit 106 for instructing the transfer, the CPU 113 may change the scene to be registered in the transfer list according to the period in which the button is pressed. Specifically, when the button is pressed for a short period of time, the CPU 113 registers only the currently recorded scene in the transfer list, or registers all registrable scenes in the transfer list. On the other hand, when the button is pressed for a long period of time, the CPU 113 registers all registrable scenes in the transfer list, or registers only the currently recorded scene in the transfer list.

The first to third exemplary embodiments illustrate a case where a scene is a set of files to be recorded between RecStart and RecStop. However, a scene may be a piece of image data.

While the present invention has been described above with reference to various exemplary embodiments, the present invention is not limited to these exemplary embodiments. The present invention can be modified without departing from the scope of the invention, and the exemplary embodiments described above may be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments described above, desired image data can be easily set as the transfer target.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-095329, filed May 12, 2017, which is hereby incorporated by reference herein in its entirety.

What is claimed is:

1. An image processing apparatus that transfers recorded image data to an external device, the image processing apparatus comprising:
a recording unit configured to record image data;
an operation unit configured to instruct transfer of the image data;
a control unit configured to perform control in such a manner that in a case where transfer of image data is instructed during recording of the image data, previously recorded image data is set as a transfer target when a predetermined period of time has not elapsed after recording of the previously recorded image data is stopped, and image data currently being recorded is set as the transfer target when the predetermined period of time has elapsed; and
a communication unit configured to transfer the image data set as the transfer target by the control unit to the external device.

2. The image processing apparatus according to claim 1, wherein
the control unit performs control in such a manner that in a case where transfer of image data is instructed during recording of the image data, the previously recorded image data is set as the transfer target when a first elapsed time from a time when recording of the previously recorded image data is stopped to a time when recording of current image data is started has not reached a first predetermined period of time, and when a second elapsed time from the start of recording of the current image data has not reached a second predetermined period of time, and
the image data currently being recorded is set as the transfer target when the first elapsed time has reached the first predetermined period of time, or when the second elapsed time has reached the second predetermined period of time.

3. The image processing apparatus according to claim 2, wherein
the control unit performs control in such a manner that the image data currently being recorded is set as the transfer target in addition to the previously recorded image data when the first elapsed time has not reached the first predetermined period of time, and when the second elapsed time has not reached the second predetermined period of time.

4. The image processing apparatus according to claim 1, wherein
when there is a plurality of pieces of the image data previously recorded, the control unit performs control to determine whether to set each piece of the image data as the transfer target.

5. The image processing apparatus according to claim 2, wherein the first predetermined period of time is shorter than the second predetermined period of time.

6. The image processing apparatus according to claim 1, wherein
in a case where transfer of image data is instructed again during recording of the image data after the previously recorded image data is set as the transfer target, the control unit performs control to add the image data currently being recorded to the transfer target, regardless of an elapsed time from a time when recording of the previously recorded image data is stopped.

7. The image processing apparatus according to claim 2, wherein
in a case where transfer of image data is instructed again during recording of the image data after the previously recorded image data is set as the transfer target, the control unit performs control to add the image data currently being recorded to the transfer target, regardless of the second elapsed time.

8. The image processing apparatus according to claim 1, wherein
in a case where transfer of image data is instructed during stopping the recording of the image data, the control unit performs control to set the previously recorded image data as the transfer target.

9. The image processing apparatus according to claim 1, wherein
the control unit performs control to display information about a time when the previously recorded image data is allowed to be set as the transfer target during recording of the image data.

10. The image processing apparatus according to claim 9, wherein
the control unit performs control to display information about a progression rate during a time when the previously recorded image data is allowed to be set as the transfer target.

11. The image processing apparatus according to claim 9, wherein
the control unit performs control to display a display item having a shape that varies depending on a time when the previously recorded image data is allowed to be set as the transfer target.

12. The image processing apparatus according to claim 1, wherein
the control unit performs control to display the number of image data to be transferred.

13. The image processing apparatus according to claim 1, wherein
in a case where the image data currently being recorded is set as the transfer target, the control unit performs control to display that the image data is currently being recorded and also display that the image data currently being recorded is set as the transfer target.

14. A control method for an image processing apparatus to transfer recorded image data to an external device, the control method comprising:

performing control in such a manner that in a case where transfer of image data is instructed during recording of the image data, previously recorded image data is set as a transfer target when a predetermined period of time has not elapsed after recording of the previously recorded image data is stopped, and image data currently being recorded is set as the transfer target when the predetermined period of time has elapsed; and transferring the image data set as the transfer target in the controlling to the external device.

15. A non-transitory storage medium storing a program to be read and executed by a computer configured to transfer recorded image data to an external device, the program causing the computer to:

perform control in such a manner that in a case where transfer of image data is instructed during recording of the image data, previously recorded image data is set as a transfer target when a predetermined period of time has not elapsed after recording of the previously recorded image data is stopped, and image data currently being recorded is set as the transfer target when the predetermined period of time has elapsed; and transfer the image data set as the transfer target in the control to the external device.

* * * * *